United States Patent [19]
Kanazawa et al.

[11] Patent Number: 5,970,037
[45] Date of Patent: Oct. 19, 1999

[54] MAGNETO-OPTICAL DISK APPARATUS

[75] Inventors: Hiroshi Kanazawa; Shimpei Shinozaki; Suguru Takishima; Isao Okuda, all of Tokyo, Japan

[73] Assignee: Asahi Kogaku Kogyo Kabushiki Kaisha, Tokyo, Japan

[21] Appl. No.: 08/756,698

[22] Filed: Nov. 26, 1996

Related U.S. Application Data

[63] Continuation of application No. 08/358,972, Dec. 19, 1994, abandoned, which is a continuation of application No. 08/073,303, Jun. 8, 1993, abandoned.

[30] Foreign Application Priority Data

| | | | |
|---|---|---|---|
| Jun. 8, 1992 | [JP] | Japan | 4-147541 |
| Jun. 8, 1992 | [JP] | Japan | 4-147542 |
| Nov. 16, 1992 | [JP] | Japan | 4-078730 U |
| Nov. 16, 1992 | [JP] | Japan | 4-078731 U |
| Nov. 16, 1992 | [JP] | Japan | 4-078732 U |
| Nov. 16, 1992 | [JP] | Japan | 4-078735 U |

[51] Int. Cl.$^6$ .............. G11B 17/04; G11B 21/02
[52] U.S. Cl. .............. 369/77.2; 369/219
[58] Field of Search .............. 369/77.1, 77.2, 369/75.1, 75.2, 270, 13, 215, 219, 244; 360/99.02, 99.06, 114

[56] References Cited

U.S. PATENT DOCUMENTS

| | | | |
|---|---|---|---|
| 4,686,592 | 8/1987 | Carroll et al. | 360/98.07 |
| 4,831,477 | 5/1989 | Sakamoto et al. | 360/99.02 |
| 4,835,646 | 5/1989 | Kurosawa et al. | 360/109 |
| 4,864,440 | 9/1989 | Satoh et al. | 360/99.02 |
| 4,896,312 | 1/1990 | Odawara et al. | 369/270 |
| 4,922,356 | 5/1990 | Yamaguchi et al. | 360/104 |
| 5,008,876 | 4/1991 | Nakagishi | 369/244 |
| 5,032,942 | 7/1991 | Kurosawa et al. | 360/109 |
| 5,058,094 | 10/1991 | Suzuki | 369/77.2 |
| 5,078,471 | 1/1992 | Takishima | 359/813 |
| 5,119,537 | 6/1992 | Hamanaka et al. | 360/104 |
| 5,146,447 | 9/1992 | Nagasato et al. | 369/77.2 |
| 5,184,342 | 2/1993 | Ishii | 369/77.2 |
| 5,189,569 | 2/1993 | Kurosawa | 360/75 |

(List continued on next page.)

FOREIGN PATENT DOCUMENTS

| | | |
|---|---|---|
| 0407191 | 1/1991 | European Pat. Off. . |
| 62-150776 | 9/1987 | Japan . |
| 63-214903 | 9/1988 | Japan . |
| 1-124172 | 5/1989 | Japan . |
| 1-144282 | 6/1989 | Japan . |
| 1-176377 | 7/1989 | Japan . |
| 2-53201 | 2/1990 | Japan . |
| 3113772 | 5/1991 | Japan . |
| 3-259444 | 11/1991 | Japan . |
| 4111244 | 4/1992 | Japan . |
| 4-241241 | 8/1992 | Japan . |
| 4310653 | 11/1992 | Japan . |

OTHER PUBLICATIONS

An English Language abstract of JP 4–111244, and comments.

Primary Examiner—David L. Ometz
Attorney, Agent, or Firm—Greenblum & Bernstein P.L.C.

[57] ABSTRACT

A magneto-optical disc apparatus, including a holder which holds a magneto-optical disc cartridge and which is movable between a loaded position, in which the holder is close to an optical head, and an unloaded position, in which the holder is apart from the optical head. The magneto-optical disc apparatus further includes a magnetic head which is movable between an initial position, in which the magnetic head is apart form the optical head, and an effective position, in which the magnetic head is close to the magneto-optical disc and can apply a magnetic field to the magneto-optical disc to record and/or play-back data. The magneto-optical disc apparatus features a mechanism for guiding the holder between the loaded position and the unloaded position. The apparatus further features a mechanism for guiding the magnetic head between the effective position and the initial position, and through an intermediate step position between the effective and initial positions.

31 Claims, 21 Drawing Sheets

U.S. PATENT DOCUMENTS

| | | | |
|---|---|---|---|
| 5,191,570 | 3/1993 | Shirai | 369/44.22 |
| 5,210,739 | 5/1993 | Nakagishi | 369/244 |
| 5,220,544 | 6/1993 | Kikuchi et al. | 360/114 |
| 5,224,079 | 6/1993 | Inoue | 369/13 |
| 5,226,024 | 7/1993 | Mukawa | 360/114 |
| 5,226,030 | 7/1993 | Konno | 360/114 |
| 5,229,900 | 7/1993 | Arai et al. | 369/77.2 |
| 5,408,455 | 4/1995 | Takishima | 369/44.32 |
| 5,513,159 | 4/1996 | Takishima | 369/44.27 |
| 5,577,008 | 11/1996 | Kanazawa et al. | 369/13 |
| 5,587,973 | 12/1996 | Kanazawa et al. | 369/13 |

MAGNETO-OPTICAL DISK APPARATUS

This application is a continuation of application Ser. No. 08/358,972, filed Dec. 19, 1994, now abandoned, which is a continuation of application Ser. No. 08/073,303, filed Jun. 8, 1993, now abandoned.

BACKGROUND OF THE INVENTION

1. Field of the Invention

The present invention relates to a magneto-optical disc apparatus in which data can be recorded on or played-back from a magneto-optical disc loaded therein.

2. Description of Related Art

For example, in a conventional magneto-optical disc apparatus in which data can be repeatedly recorded on a magneto-optical disc, intensive laser beams emitted from an optical head are continuously converged onto a recording layer of the magneto-optical disc to raise the temperature to the Curie temperature. At the Curie temperature, a magnetic field is applied by a biasing magnetic field generator (i.e., magnetic head) to make the direction of magnetization of a magnetic substance coincident with that at the initialization thereof. Thereafter, the biasing magnetic field is inverted, so that laser beams of high power can be discontinuously converged onto the recording layer to invert the direction of magnetization and thereby record data on the recording layer.

In this type of magneto-optical disc apparatus, upon rewriting data of each track of the magneto-optical disc, it is necessary to rotate the magneto-optical disc to erase and record data, resulting in a decreased recording speed. To solve this problem, a magnetic modulation overwriting type of magneto-optical disc apparatus has been proposed, in which the magnetic field of S or N is intermittently applied to a small area on which the laser beams are to be converged. In such an apparatus, one rotation of the magneto-optical disc enables data to be rewritten.

In a known magnetic modulation overwriting type of magneto-optical disc apparatus, it is necessary to apply a magnetic field which has been quickly modulated to the magneto-optical disc to thereby realize a quick overwriting. To this end, it is necessary to miniaturize the magnetic head which must be placed as close as possible to the recording layer of the magneto-optical disc. However, if placed too close, the magnetic head may accidentally come into contact with the glass (or resin) surface of the magneto-optical disc during rotation thereof. This will be particularly likely if the magnetic head becomes unstably loaded with respect to the magneto-optical disc. For the preceding reasons, it has become necessary to realize a simple magneto-optical disc apparatus in which a magnetic head is stably held as close as possible to a photo magnetic disc, at a loaded position thereof, without accidentally coming into contact with the magneto-optical disc.

SUMMARY OF THE INVENTION

The primary object of the present invention is to provide a simple magneto-optical disc apparatus in which a magnetic head is stably loaded and held with respect to a magneto-optical disc at a loaded position thereof.

To achieve the object mentioned above, according to the present invention, a magneto-optical disc apparatus is provided, including a holder which holds a magneto-optical disc cartridge and which is movable between a loaded position, in which the holder is close to an optical head, and an unloaded position, in which the holder is apart from the optical head. The magneto-optical disc apparatus further includes a magnetic head which is movable between an initial position, in which the magnetic head is apart from the optical head, and an effective position, in which the magnetic head is close to the magneto-optical disc and can apply a magnetic field to the magneto-optical disc to record and/or play-back data. The magneto-optical disc apparatus features guide cam plates for guiding the holder between the loaded position and the unloaded position, and guide cam plates for guiding the magnetic head between the effective position and the initial position.

With this structure, the movement of the cartridge holder and the magnetic head can be easily controlled by the movement of the guide cam plates through cam grooves provided therein, so that the magnetic head can be stably moved close to a magneto-optical disc located in the loaded position.

Preferably, holder cam grooves are provided on the guide cam plates and have initial, intermediate and final portions corresponding to initial, intermediate and final positions of the cam plates. The holder is held in the unloaded position at the initial position of the cam plates, is moved to and from the loaded position when the cam plates are moved between the initial and intermediate positions, and remains in the loaded position when the cam plates are moved between the intermediate and final positions.

It is further preferable that head cam grooves are provided on the guide cam plates and have initial, intermediate and final portions corresponding to initial, intermediate and final positions of the cam plates. The magnetic head is held in the initial position at the initial position of the cam plates, is moved to and from an intermediate position between the initial and effective positions when the cam plates are moved between the initial and intermediate positions, and is moved to and from the effective position when the cam plates are moved between the intermediate and final positions.

It is also preferable that a mechanism for discriminating the type of magneto-optical disc loaded in the cartridge, when the holder is moved to the loaded position and the magnetic head is moved to the intermediate position, is provided.

According to another aspect of the present invention, a magneto-optical disc apparatus is provided which includes a magnetic head that is movable towards and away from a magneto-optical disc to record and/or play-back data. The apparatus comprises a head base which supports the magnetic head, a head base stop mechanism for restricting the distance to within which the head base can be brought with respect to the magneto-optical disc, at least one plate which moves together with the head base towards and away from the magneto-optical disk, at least one stud provided on the plate and extending through the head base, and a spring supported on the stud for biasing the head base against the stop mechanism when the plate is moved towards the magneto-optical disc beyond the point at which the headbase contacts the stop mechanism.

With this arrangement, not only can precise positioning of the magnetic head be achieved, but also the magnetic head can be stably moved to positions very close to the magneto-optical disc.

The present disclosure relates to subject matter contained in Japanese patent application Nos. 4-147541 and 4-147542 (both filed on Jun. 8, 1992) and, Japanese utility model application Nos. 4-78730, 4-78731, 4-78732, and 4-78735 (all filed on Nov. 16, 1992), all of which are expressly incorporated herein by reference in their entirety.

BRIEF DESCRIPTION OF THE DRAWINGS

The invention will be described below in detail with reference to the accompanying drawings, in which.

DESCRIPTION OF THE PREFERRED EMBODIMENT

A known disc cartridge for a 5.25 inch disc (ISO standard) has been used with a conventional magneto-optical disc apparatus in which a magneto-optical disc is rotated when data is erased or recorded. The disc cartridge, in which a double-sided disc of ISO standard format is inserted, is provided with an opening which extends in the radial direction of the double-sided disc from the center of the disc to the outer periphery thereof. When the disc cartridge is loaded in the magneto-optical disc apparatus, a large biasing electromagnet (or permanent magnet) is located below the opening and extends across the opening in the radial direction, so that the biasing magnetic field can be applied to the magneto-optical disc loaded in the apparatus. Note that the "double-sided disc" refers to a disc having opposite surfaces on which data can be recorded.

To rewrite data of each track of the magneto-optical disc, it is necessary to rotate the magneto-optical disc every time data is erased and recorded. This results in a decreased recording speed, as mentioned above. To solve this problem, it is also known to use a magnetic modulation overwriting type magneto-optical disc apparatus, in which a magnetic field of S or N is intermittently applied to a small area on which the laser beams are to be converged, so that data can be rewritten by one rotation of the magneto-optical disc, as mentioned above.

The basic structure of the magnetic modulation overwriting type magneto-optical disc apparatus is incorporated in the present invention and is discussed below.

Figure 1:
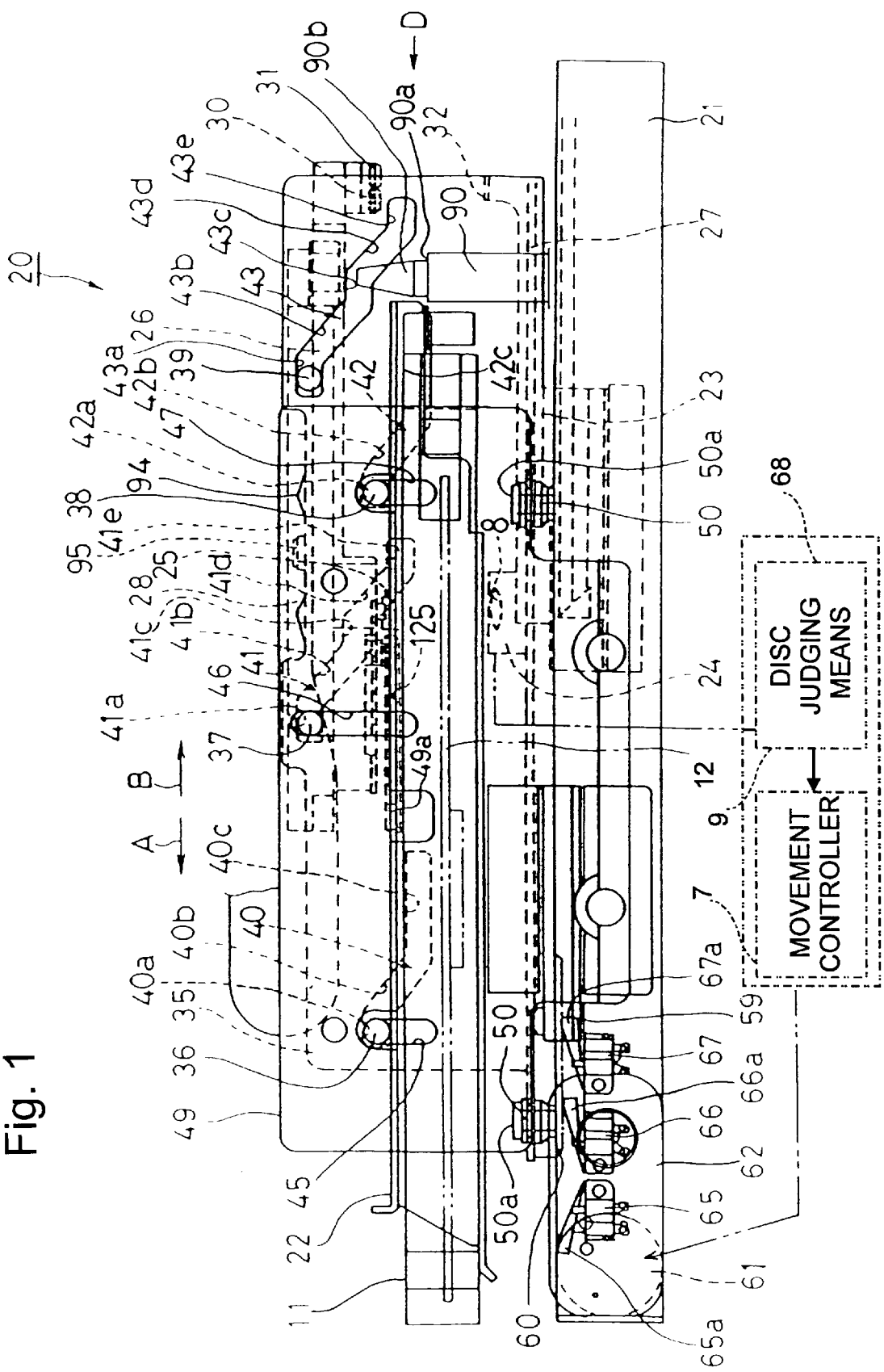
FIG. 1 is a side elevational view of a magneto-optical disc apparatus in an unloaded position, according to the present invention.
Figure 21:
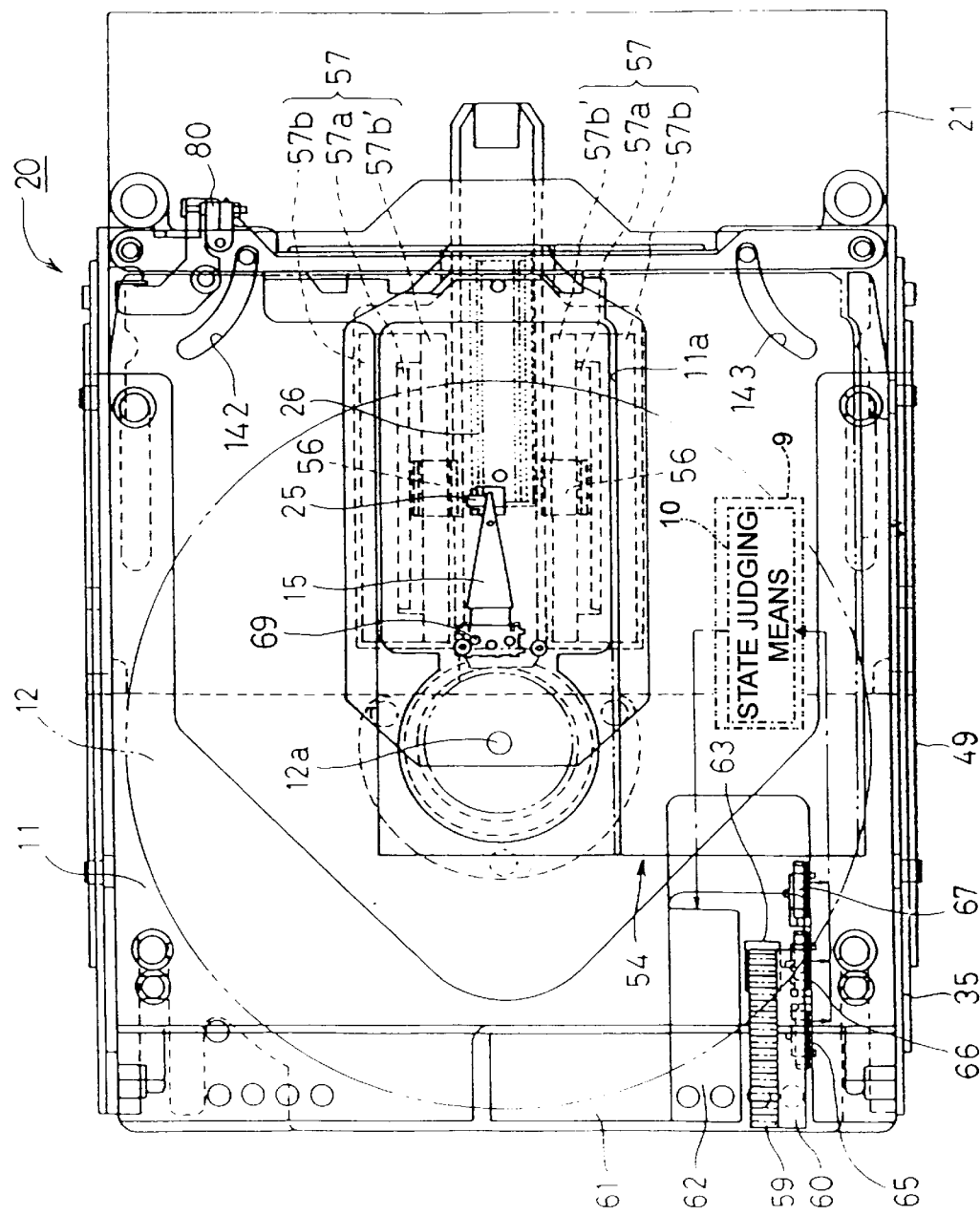

FIG. 21 is a plan view of a magnetic field modulating overwriting type of magneto-optical disc apparatus 20 to which the basic concept of the present invention is applied. FIG. 1 is a side view of the apparatus shown in FIG. 21. The photo magnetic disc apparatus 20 includes a cartridge holder 22 which holds a disc cartridge 11 in which the magneto-optical disc 12 is loaded, an optical head substrate 21, an optical head carriage 23 which moves an optical head 24 in the radial direction of the magneto-optical disc 12 along a linear bearing 51 (FIGS. 4 through 6) provided on the optical head substrate 21, and a magnetic head carriage 26 which moves a magnetic head 25 in the radial direction of the magneto-optical disc 12. Note that numerals 54 and 12a in FIG. 21 designate a shutter of the disc cartridge 11 and a center of rotation of the magneto-optical disc 12, respectively.

Figure 8:
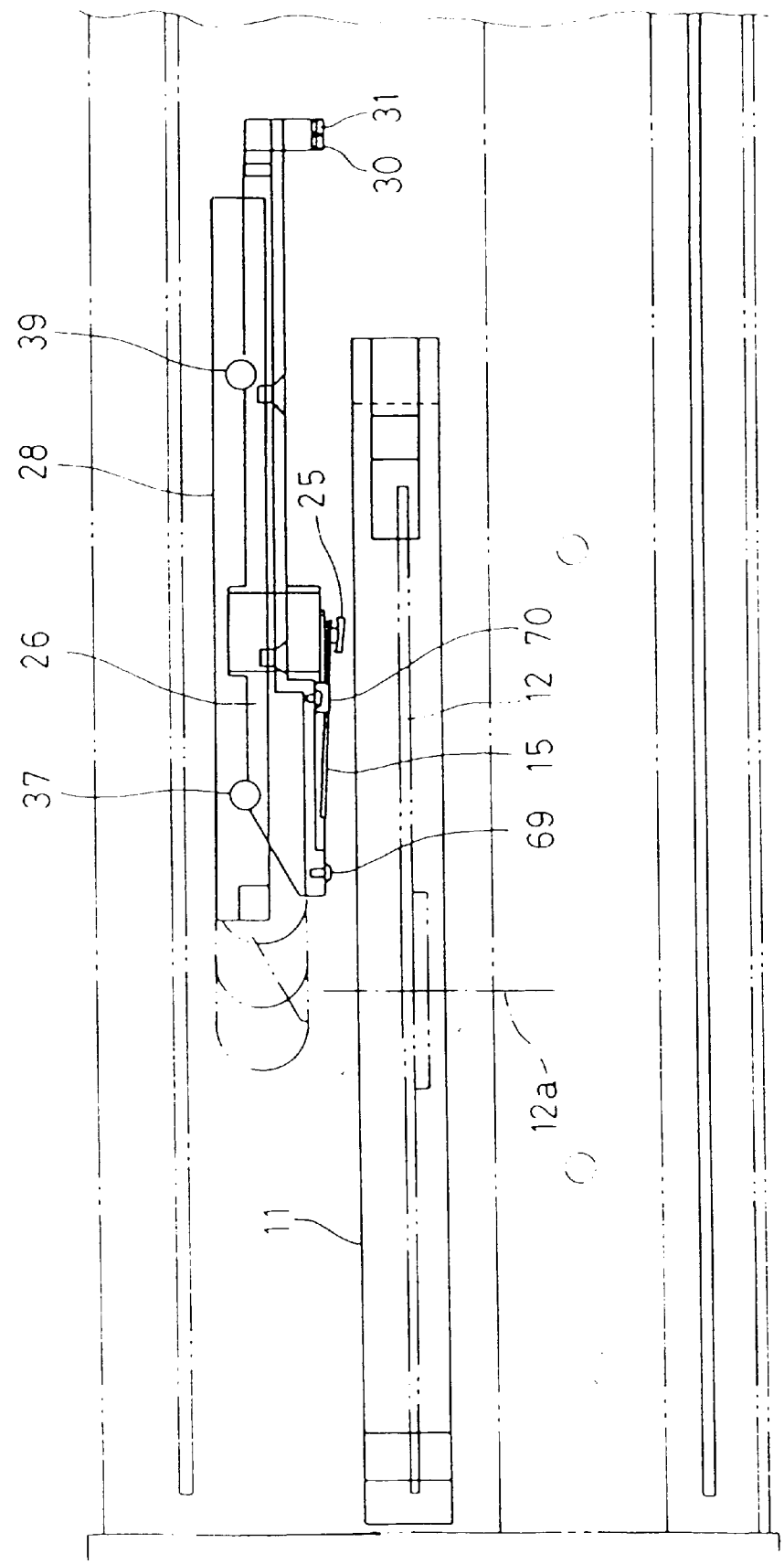
FIG. 8 is a side elevational view of main parts of a magneto-optical disc apparatus, in an unloaded position, according to the present invention.
Figure 9:
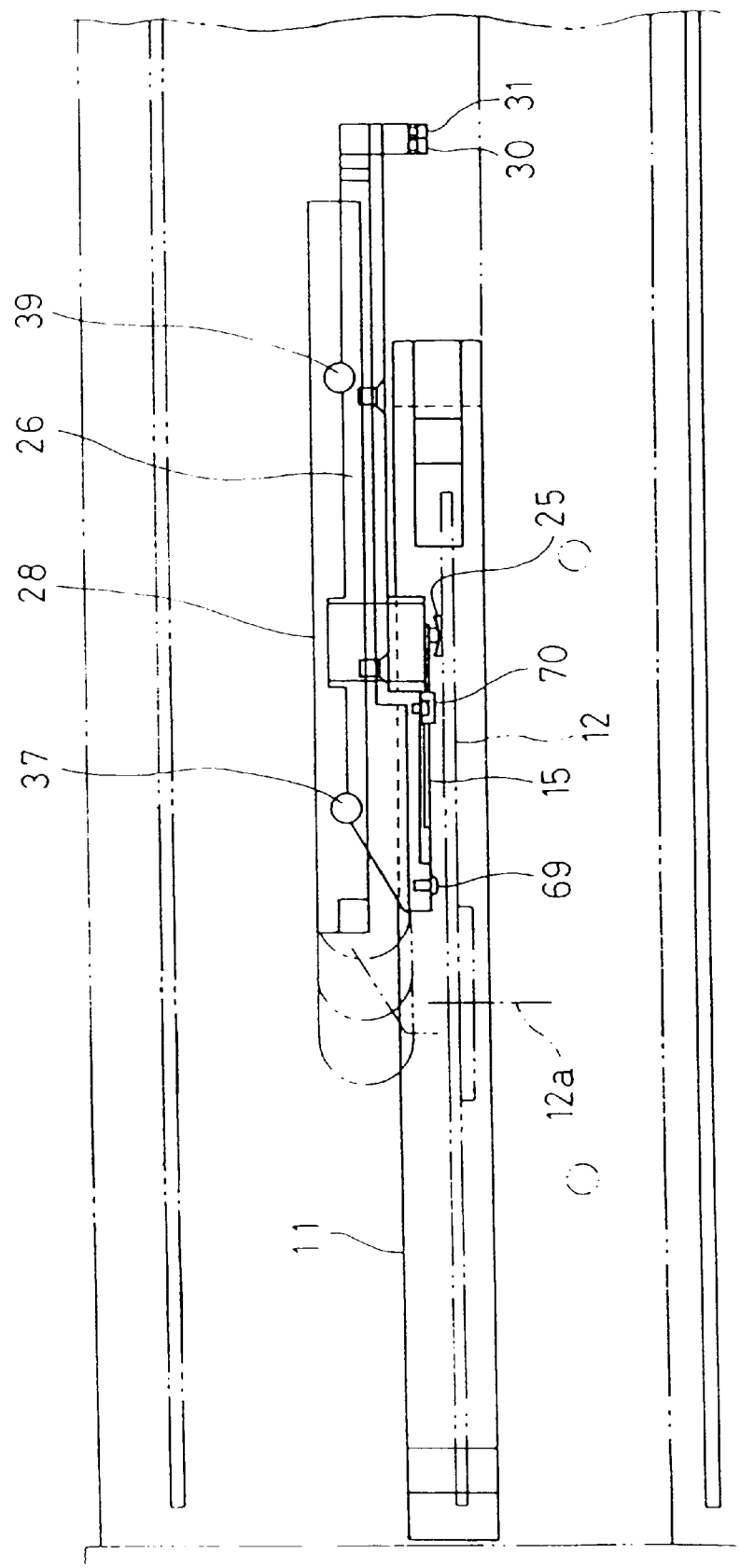
FIG. 9 is a side elevational view of main parts of a magneto-optical disc apparatus, in a record/play-back position, according to the present invention.
Figure 10:
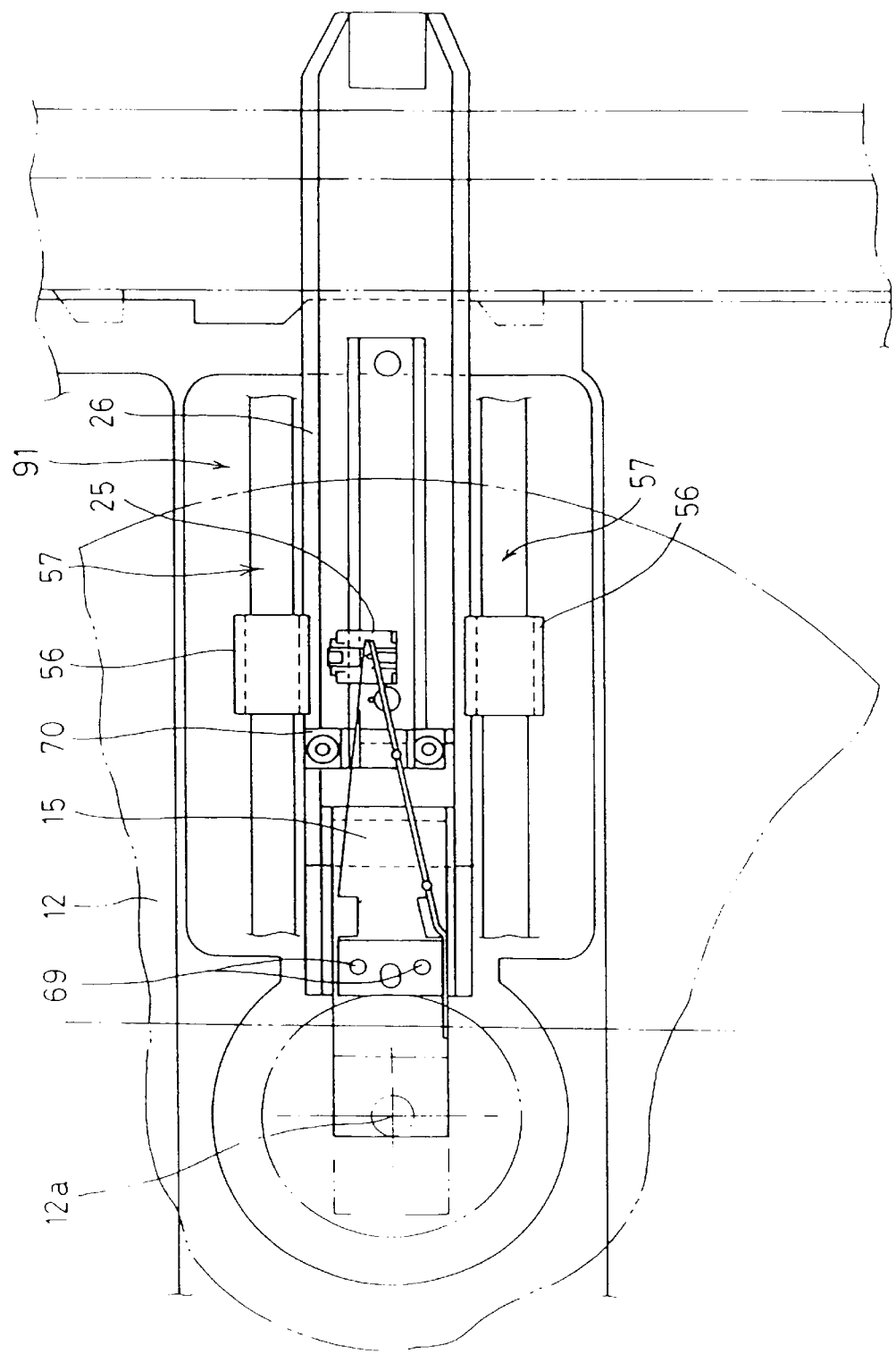
FIG. 10 is an enlarged view of a magnetic head of a magnetic head carriage and surrounding elements, according to the present invention.
Figure 11:
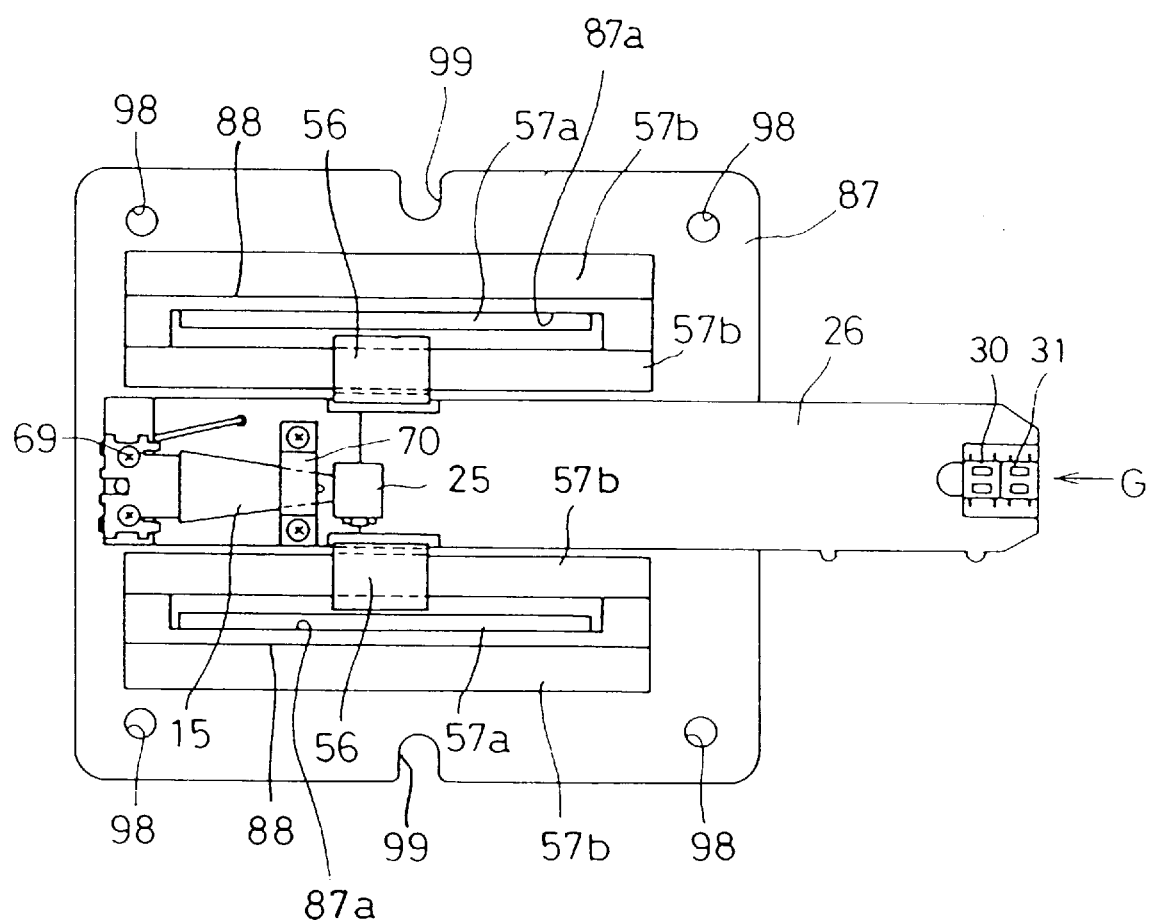
FIG. 11 is a bottom view of a base plate which supports a magnetic head carriage, according to the present invention.
Figure 12:
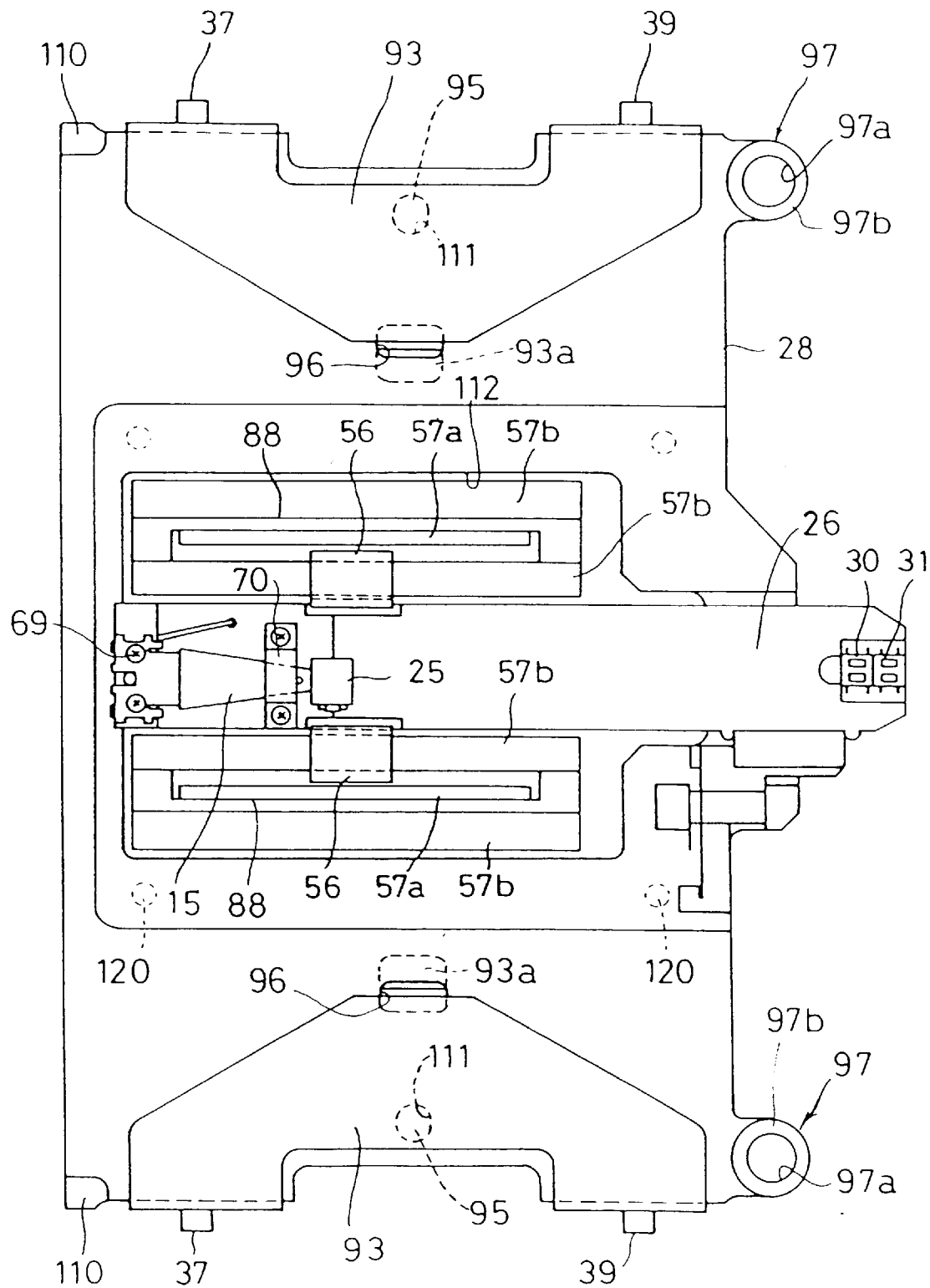
FIG. 12 is a bottom view of a magnetic head base which supports a base plate shown in FIG. 11.

FIGS. 8 through 10 are enlarged views of the magnetic head 25 and the surrounding elements thereof. FIG. 10 is an enlarged view of the magnetic head 25. FIG. 11 is an enlarged bottom view of the magnetic head 25. FIG. 12 shows floating type magnetic head 25 and the surrounding elements thereof.

The base end of a cantilever type flexible plate 15 is secured to the back surface of magnetic head carriage 26 (i.e., the side of the carriage near the center of the disc) by set screws 69. In the unloaded position shown in FIG. 1, the flexible plate 15 is elastically deformed in the downward direction and comes into contact with a magnetic head retaining plate 70. In this position, when a drive motor 61 is effected, guide cam plates 35 are driven, lowering the disc cartridge 11 to a predetermined position. Thereafter, when the magneto-optical disc 12 is rotated, the floating type magnetic head 25, which has been moved close to the magneto-optical disc 12, is deflected upward by the wind pressure (i.e., increased air pressure) which is caused by the rotation of the disc 12. Consequently, the magnetic head 25 comes extremely close to the surface of the magneto-optical disc 12, as shown in FIG. 9.

Usually, only a double-sided disc is loaded in the disc cartridge of ISO standard, as mentioned above.

Nevertheless, in the present invention, it is possible to load a single-sided recording disc (i.e., a disc in which data can be recorded only on one surface thereof), in the disc cartridge. Namely, in a magnetic modulation overwriting type of magneto-optical disc apparatus, as mentioned above, a quickly modulated magnetic field must be applied to the magneto-optical disc. To this end, it can be considered that the ISO standard disc cartridge, in which a single recording disc is loaded, is incorporated in the magnetic modulation overwriting type of magneto-optical disc apparatus. In this consideration, it is necessary to miniaturize the magnetic head which must be moved as close as possible to the recording layer of the disc in order to apply the quickly modulated magnetic field to the magneto-optical disc.

In the simplest solution to the above-described problem, a flexible plate is secured to a magnetic head mounting portion on the side near the periphery of the disc, so that the base end of the flexible plate is located far from the center of the magneto-optical disc. The magnetic head is supported by the front end of the flexible plate to realize an air-floating type magnetic head.

However, in this solution, since there is little or no dimensional tolerance (i.e., play) at the outer side of the disc; it is likely that the rear end of the flexible plate will abut against the outer wall portion of the disc cartridge when the magnetic head is moved in the radial and outward direction of the magneto-optical disc. This makes it impossible to move the magnetic head to a correct position corresponding to outer recording tracks of the magneto-optical disc. Accordingly, magnetic modulation overwriting cannot be carried out for the recording areas of the outer recording tracks of the magneto-optical disc.

To overcome this problem, in the magneto-optical disc apparatus 20 of the present invention, since the magnetic head 25, which is moved across the magneto-optical disc 12 within the disc cartridge 11 in the radial direction of the magneto-optical disc 12, is mounted to the front end of the cantilever type flexible plate 15 whose base end is located near the center 12a of rotation of the magneto-optical disc 12, as mentioned above, the rear end of the flexible plate 15 will not contact the outer wall portion 11b of the disc cartridge 11. Consequently, even if an ISO standard disc cartridge for a 5.25 inch disc is used with the type of magneto-optical disc apparatus in which data can be rewritten by one rotation of the magneto-optical disc, the magnetic modulation overwriting can be effected over the whole recording area of the magneto-optical disc.

Disc cartridge 11, in which a magneto-optical disc 12 is inserted, is provided on the upper surface thereof with a head access window 11a (FIGS. 4 through 6), and a shutter 54 which opens and closes the access window 11a. A cartridge holder 22 is movable up and down with respect to the optical head 24, so that when the disc cartridge is loaded or unloaded, the cartridge holder is moved away from the optical head 24. When the disc cartridge 11 is inserted in the magneto-optical disc apparatus, the cartridge holder is moved close to the optical head 24 to set the magneto-optical disc 12 in a predetermined position.

Figure 4:
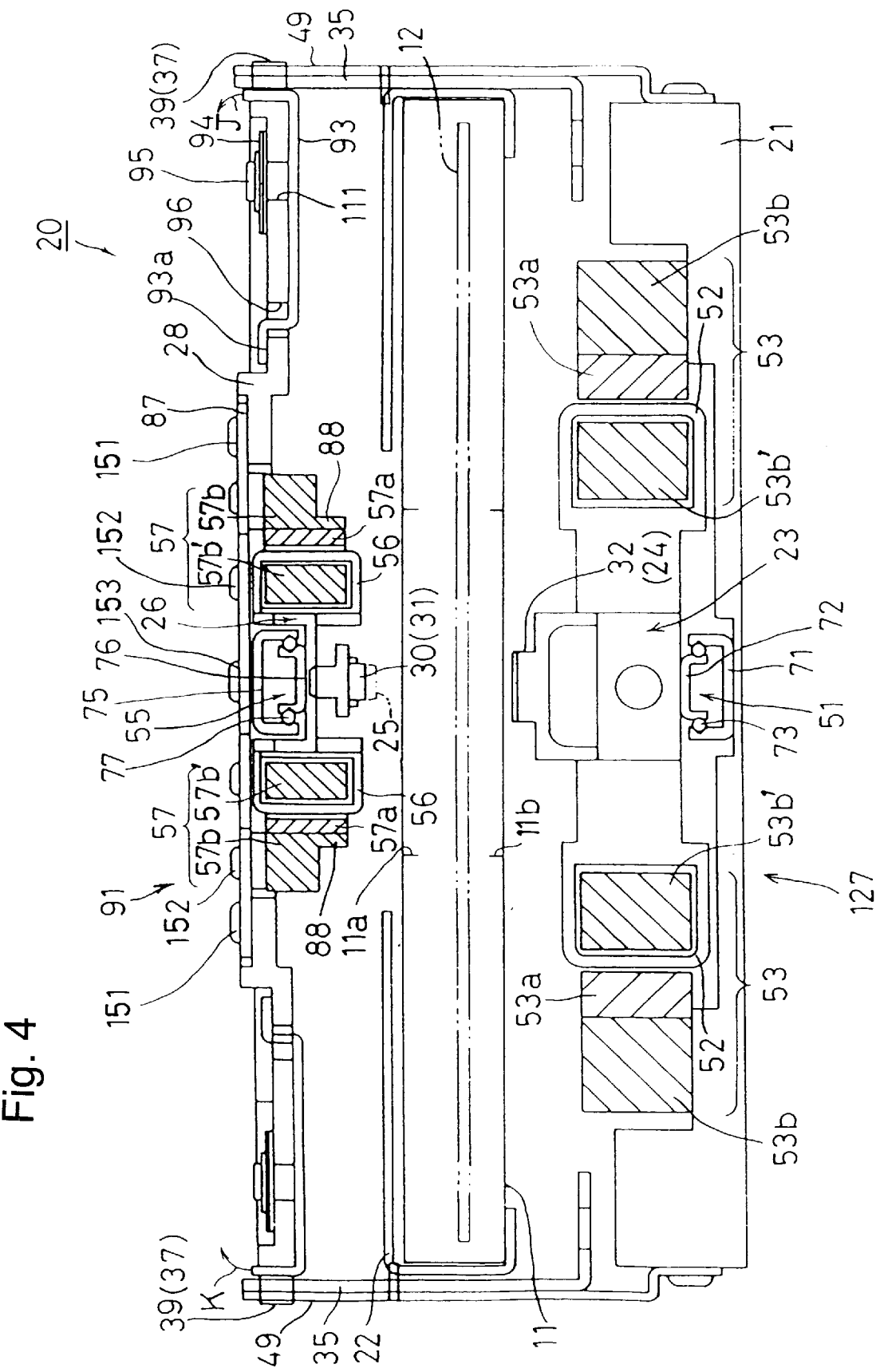
FIG. 4 is a right end view of a magneto-optical disc apparatus, viewed from the direction indicated as D in FIG. 1.
Figure 20:
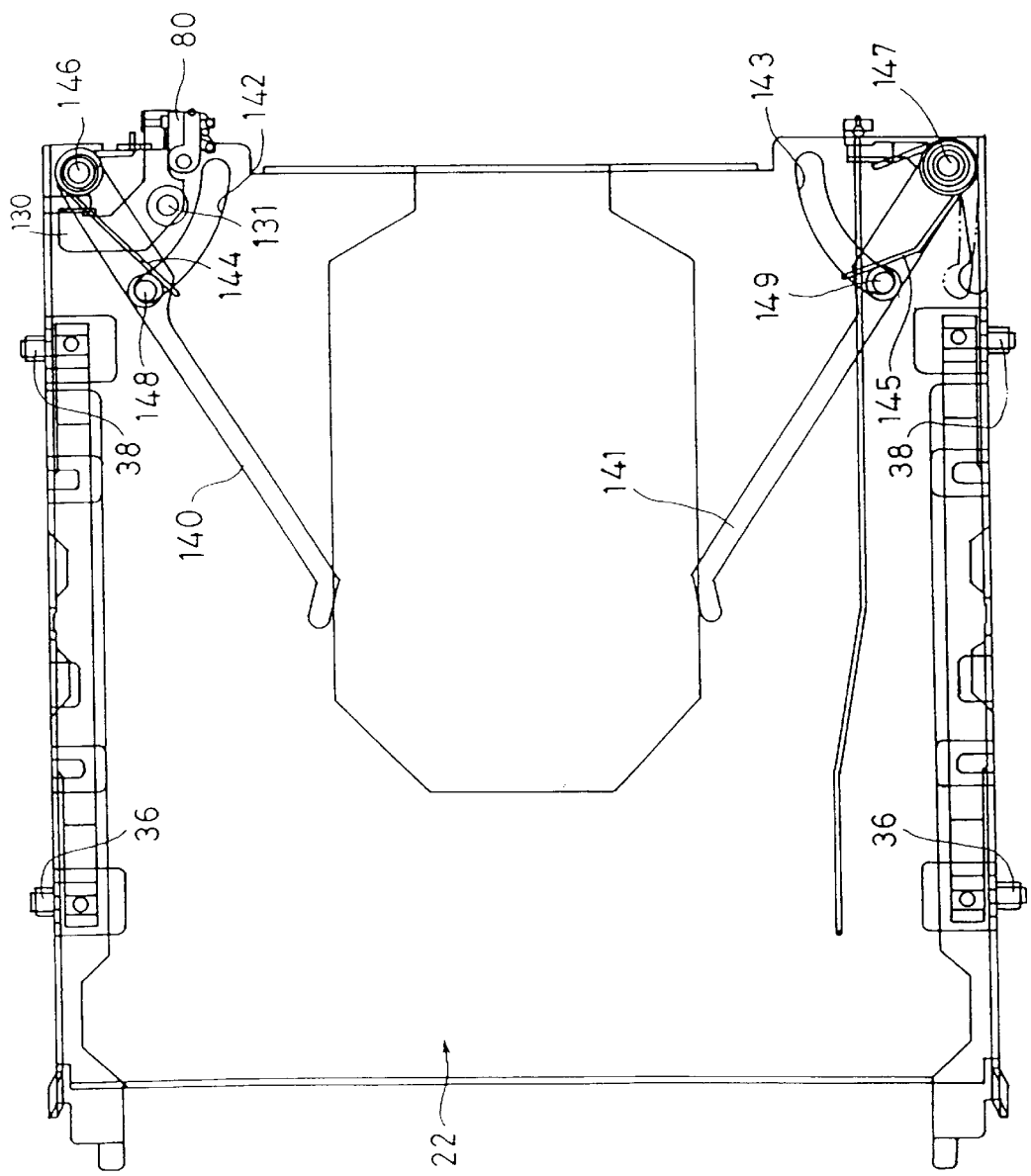
FIG. 20 is a plan view of a cartridge holder according to the present invention; and, FIG. 21 is a plan view of a magneto-optical disc apparatus to which the present invention is applied.

Cartridge holder 22, which holds the disc cartridge 11, is provided, on the front portion thereof in the direction of insertion of the disc cartridge 11, with shutter opening arms 140 and 141. Arms 140 and 141 are pivoted on the cartridge holder through pivot shafts 146 and 147, respectively, as shown in FIG. 20. The shutter opening arms 140 and 141 are for the opposite surfaces A and B of the disc, respectively. When the disc cartridge 11 is loaded in the cartridge holder 22, the front end of the shutter opening arm 140 or 141 is engaged with the corresponding portion of the shutter 54 to rotate the same to thereby open the head access window 11a or 11b (FIG. 4).

Cartridge holder 22 is also provided, on the front end portion thereof, with arched grooves 142 and 143 in the vicinity of the pivot shafts 146 and 147, respectively. Guide pins 148 and 149, provided in the vicinity of the pivot shafts 146 and 147, are slidably fitted in the respective arched grooves 142 and 143. The shutter opening arms 140 and 141 are continuously biased by coil springs 144 and 145, which are wound about the pivot shafts 146 and 147, as shown in FIG. 20, respectively.

Cartridge holder 22 is provided on the front end thereof with a loading switch 80 which is actuated to drive the motor 61. The loading switch 80 is turned ON by a detecting lever 130 which is rotated about a shaft 131 by the insertion of the disc cartridge 11 into the cartridge holder 22.

Guide cam plates 35, which are provided outside the cartridge holder 22 on the right and left sides, are guided by respective guide rollers 50 which are provided on the optical head substrate 21 so as to slide in the directions indicated at arrows A and B in FIG. 1.

Figure 2:
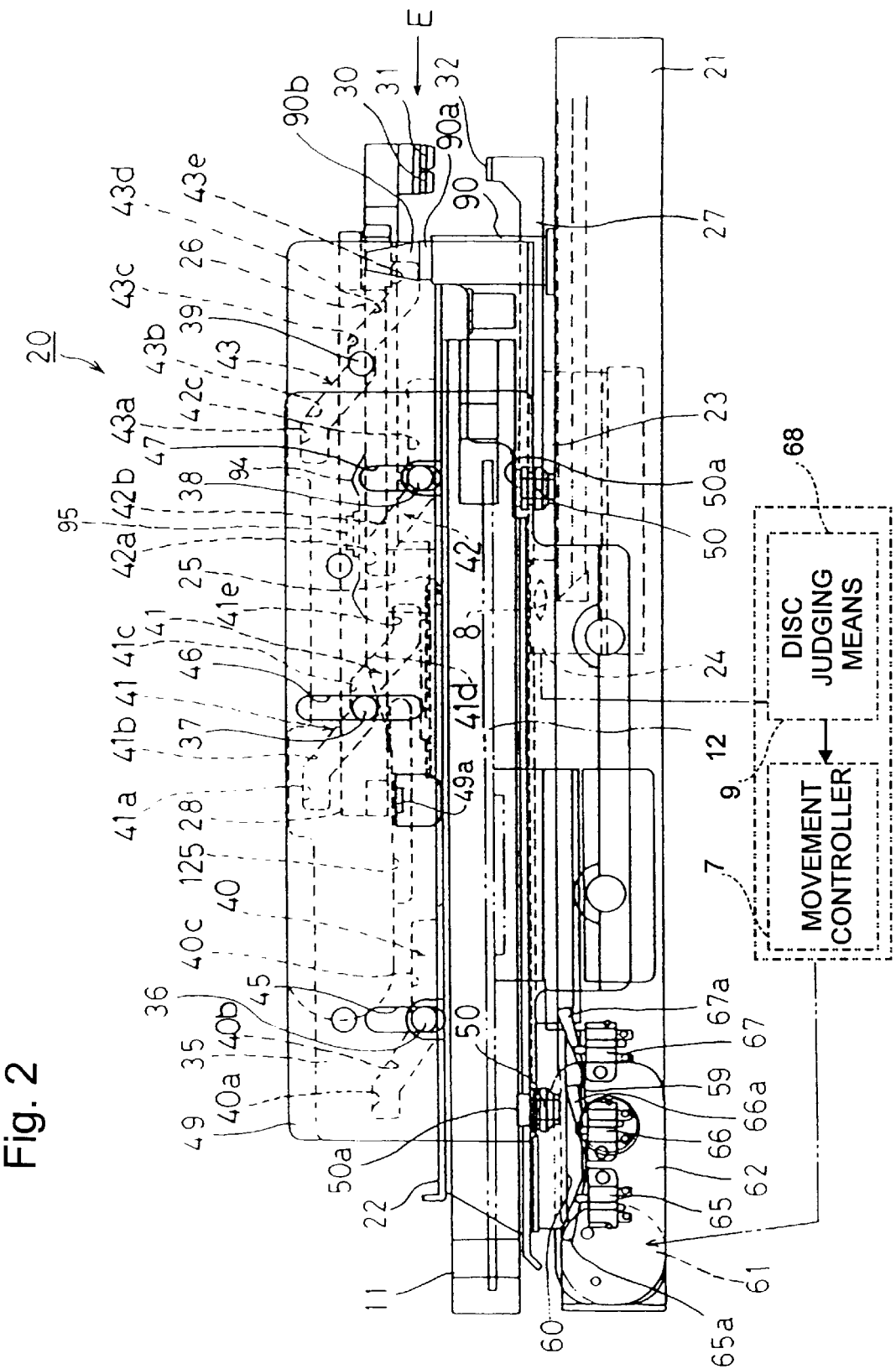
FIG. 2 is a side elevational view of a magneto-optical disc apparatus in a play-back position, according to the present invention.
Figure 3:
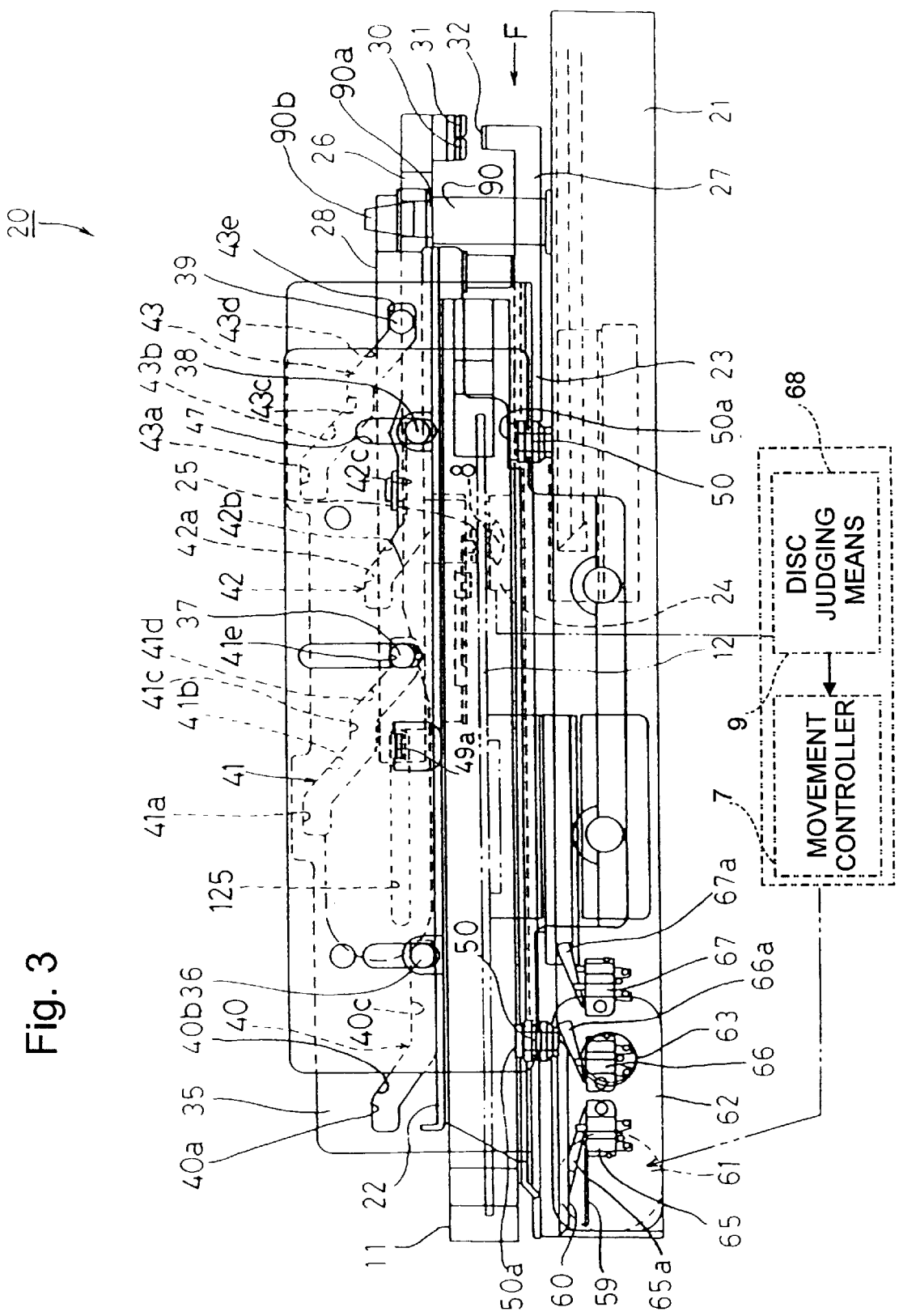
FIG. 3 is a side elevational view of a magneto-optical disc apparatus in a record/play-back position, according to the present invention.

Right and left guide cam plates 35 are each provided with two generally crank-shaped cam grooves 40, 42 for the cartridge holder, two generally crank-shaped cam grooves 41 and 43 for the magnetic head, and an elongated hole 125. Right and left stationary cam plates 49 are provided outside the respective guide cam plates 35. The stationary cam plates 49 are each provided with cam grooves 45, 46 and 47 corresponding to the cam grooves 40, 42 for the cartridge holder and the cam groove 41 for the magnetic head, respectively. The cam grooves 45, 46 and 47 extend in the vertical direction, as can be seen in FIGS. 1 through 3.

Right and left stationary cam plates 49 are provided with projections 49a (FIGS. 1 through 3) which are formed by cutting and bending the stationary cam plates 49 towards the respective guide cam plates 35, so that the projections 49a extend through the respective elongated holes 125 of the guide cam plates 35. The projections 49a restrict the lower position of right and left abutments 110 (FIG. 12) of the magnetic head base 28.

Cartridge holder 22 is provided, on the right and left side faces thereof, with cam pins 36 and 38 which are fitted in the cam grooves 40 and 45 and the cam grooves 42 and 47, respectively. The magnetic head base 28 is provided on the right and left side surfaces thereof with cam pins 37 and 39 which are fitted in the cam grooves 41 and 46 and the cam grooves 43, respectively.

Cam grooves 40 and 42 have unloaded portions (i.e., initial portions) 40a and 42a, respectively, which maintain the cam pins 36 and 38, respectively, and the disc cartridge 11 in an unloaded position. Portions 40a and 42a correspond to an initial position of the guide cam plates 35 shown in FIG. 4. The cam grooves 40 and 42 also have moving portions 40b and 42b which guide the cam pins 36 and 38, respectively, and the disc cartridge 11 to and in a loaded position, after movement of the guide cam plates 35. The cam grooves 40 and 42 have substantially horizontal loaded portions (final portions) 40c and 42c which retain the cam pins 36 and 38, respectively, and, consequently, the disc cartridge 11 in the loaded position.

Cam grooves 41 and 43 for the magnetic head have unloaded portions (i.e., initial portions) 41a and 43a which hold the cam pins 37 and 39, respectively, and, consequently, the magnetic head 25 (i.e., magnetic head carriage 26) in an unloaded position (i.e., initial position) of the guide cam plates 35 shown in FIG. 4. Cam grooves 41 and 43 further have moving portions 41b and 43b which guide the cam pins 37 and 39, respectively, to move the magnetic head 25 to intermediate step portions 41c and 43c, corresponding to intermediate positions between the loaded position and the unloaded position, at a beginning movement of the guide cam plates 35. The cam grooves 41 and 43 for the magnetic head 25 are also provided with moving portions 41d and 43d which guide the cam pins 37 and 39, respectively, to move the magnetic head 25 to the loaded position (i.e., final position), by further movement of the guide cam plates 35, subsequent to the beginning movement, and loaded portions (i.e., final portions) 41e and 43e which hold the cam pins 37 and 39, respectively, in a position which maintains the magnetic head 25 in the loaded position.

A rack plate 59 (FIG. 21) and a switch operation plate 60 are secured to the guide cam plates 35. The drive motor 61 and a gear box 62, to transmit the rotation of the drive motor 61, are provided in the body of the apparatus. The rotation of the drive motor 61 is transmitted to the rack plate 59 as a linear movement through a pinion 63 (FIG. 21). The drive motor 61 is rotated in the forward direction through an association circuit (not shown), when the cartridge holder 22, in which the disc cartridge 11 is loaded, is pushed in the loaded direction.

First, second and third detecting switches 65, 66 and 67 are provided in the body of the apparatus, corresponding to the switch operation plate 60. The detecting switches 65, 66 and 67 have respective switch levers 65a, 66a and 67a. The detecting switches 65, 66 and 67 are turned ON or OFF when the switch levers 65a, 66a and 67a are pushed or released by the switch operation plate 60, which is moved together with the guide cam plates 35, to detect the position of the guide cam plates 35. Consequently, the current positions of the disc cartridge 11 and the magnetic head base 28 can be detected.

In the position shown in FIG. 1, the switch operation plate 60 turns the first detecting switch 65 OFF and the second and third detecting switches 66 and 67 ON, respectively. In the position shown in FIG. 5, the first and third detecting switches 65 and 67 are turned OFF, and the second detecting switch 66 is turned ON, respectively. Furthermore, the first detecting switch 65 is turned ON, and the second and third detecting switches 66 and 67 are turned OFF, respectively, in the position shown in FIG. 6.

A control means 9, which can take the form of a micro computer for example, has a state judging means 10 (FIG. 21) which judges the state of the magneto-optical disc apparatus 20 in accordance with bit signals, depending on the ON/OFF states of the first, second and third detecting switches 65, 66 and 67. Namely, the state judging means 10 judges whether the magneto-optical disc apparatus 20 is in the unloaded position, the play-back position, or the record/play-back position. In the unloaded position, the magnetic head 25 and the disc cartridge 11 are located in their initial positions, and the disc cartridge can be loaded or unloaded. In the play-back position, the disc cartridge 11 is located in the loaded position and the magnetic head 25 is in the intermediate position, between the unloaded position and the loaded position, so that only play-back, using the optical head 24, can be effected. In the record/play-back position, the disc cartridge 11 and the magnetic head 25 are both located in the loaded position.

In the illustrated embodiment, the magneto-optical disc 12 has an inner control track on which optical code signals representing the kind of the disc (i.e., double-sided or single-sided recording disc) which is loaded can be recorded. The optical code signals are read by the optical head 24 in the play-back position in which the disc cartridge 11 is in the loaded position and the magnetic head 25 is in the intermediate position. Consequently, a disc judging means 68 (FIG. 1) of the control means 9 discriminates which kind of disc 12 (double-recording disc or single recording disc), loaded in the apparatus.

If a double-sided disc is detected by the disc judging means 68, a movement controller 7 of the control means 9 does not drive the drive motor 61, so that no further movement of the guide cam plates 35, in a position in which the play-back can be carried out, takes place. If a single-sided disc is detected by the disc judging means 68, the movement controller 7 of the control means 9 drives the motor 61 in the forward direction to further move the guide cam plates 35 in the same direction, moving the magnetic head 25 to the loaded position in which data can be recorded and reproduced.

As can be understood from the above discussion, the magnetic head 25 can be moved to the loaded position only when a single-sided recording disc is loaded. Accordingly, the magnetic head is not moved to the loaded position when the double-sided disc, having a thickness that is different from that of the single-sided recording disc, is loaded. Consequently, accidental sliding contact of the magnetic head and the disc surface is prevented.

The discussion below will be directed to an optical head linear motor mechanism 127 and a magnetic head linear motor mechanism 91 which move the optical head 24 and the magnetic head 25, respectively.

Figure 5:
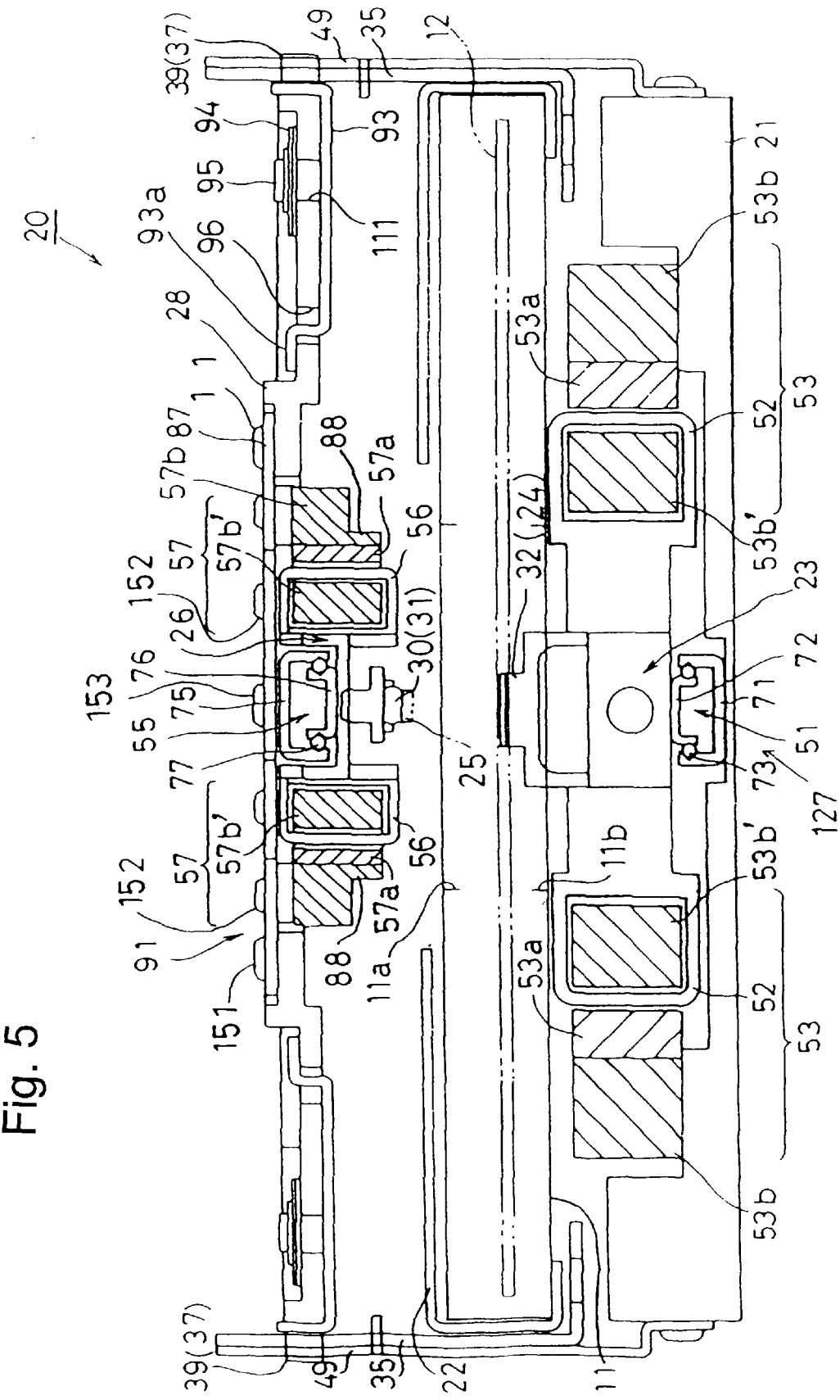
FIG. 5 is a right end view of a magneto-optical disc apparatus, viewed from the direction indicated as E in FIG. 2.
Figure 6:
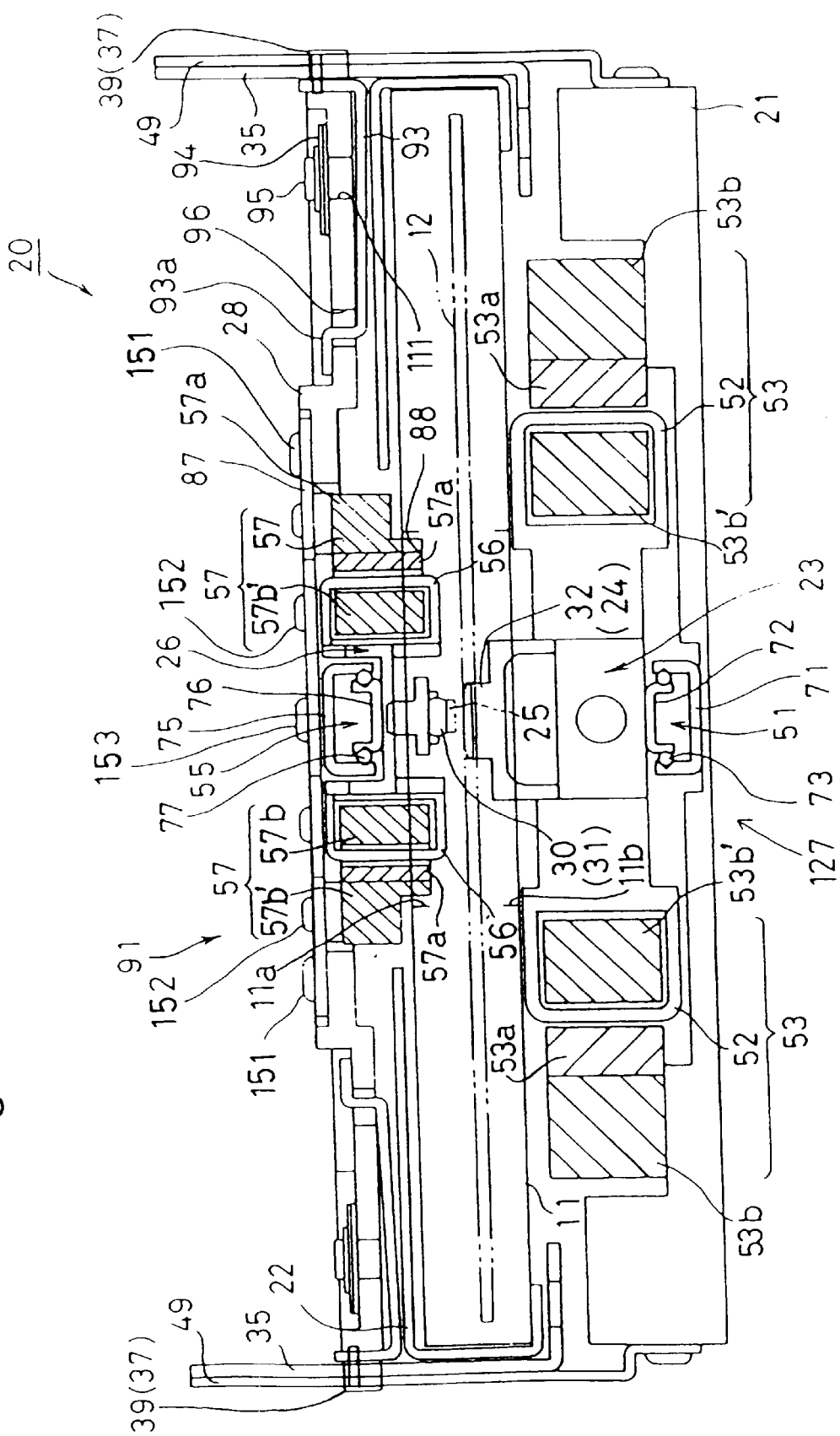
FIG. 6 is a right end view of a magneto-optical disc apparatus, viewed from the direction indicated as F in FIG. 3.

The optical head carriage 23 which supports the optical head 24 is movable in the radial direction of the magneto-optical disc 12 through the linear bearing 51, as shown in FIGS. 4 through 6. The optical head carriage 23 is provided with coils 52 which are secured to opposite ends thereof. The coils 52 are movable with respect to respective yokes 53b' connected to yokes 53b. The yokes 53b and 53b' constitute a magnetic circuit 53, together with the permanent magnets 53a located between the respective yokes 53b and 53b'. Yokes 53b, Yokes 53b', the permanent magnets 53a, and the coils 52 constitute the optical head linear motor mechanism 127, which drives the optical head carriage 23.

Figure 7:
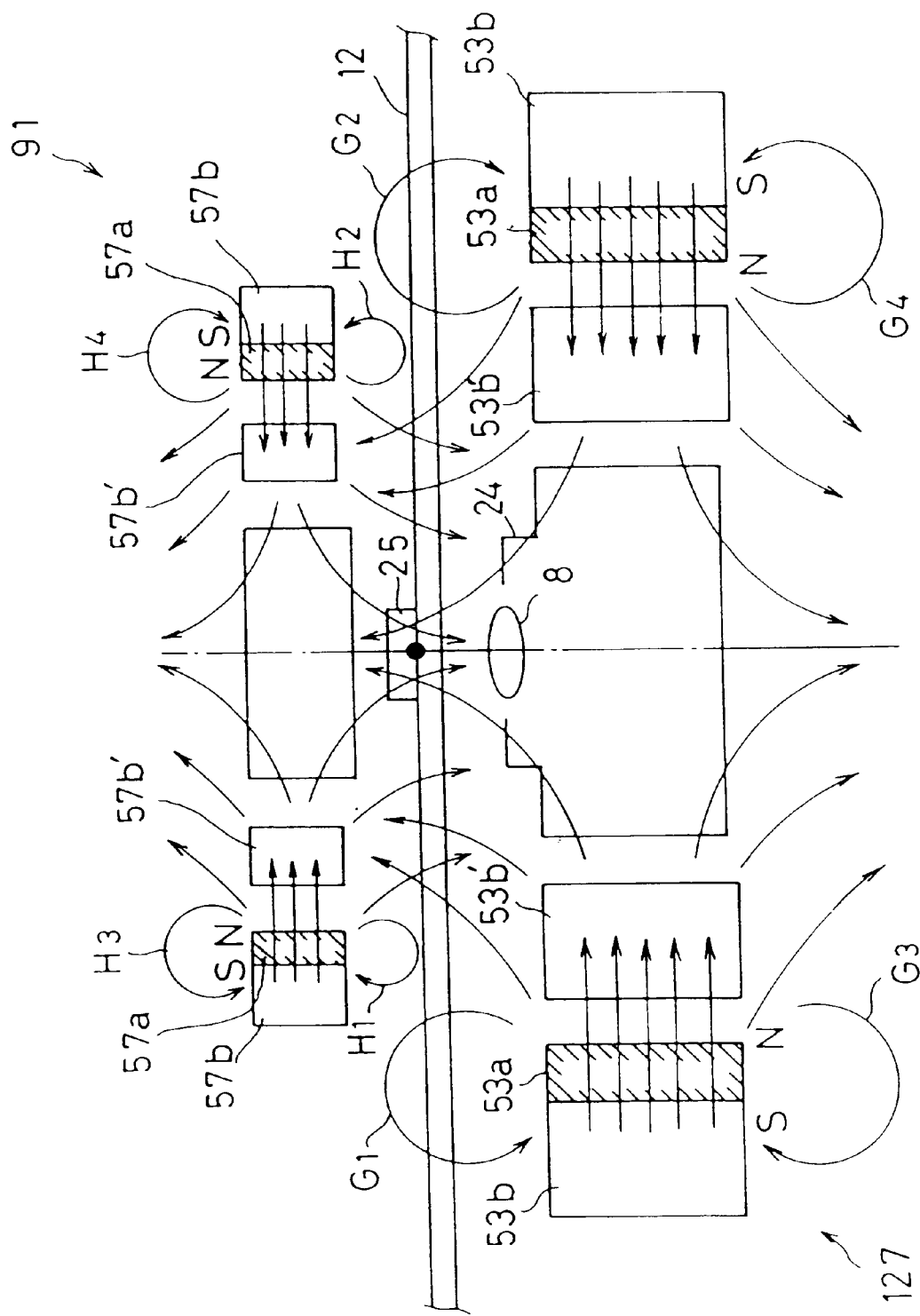
FIG. 7 is a conceptual side elevational view of a linear motor apparatus for moving an optical head and a magnetic head in a magneto-optical disc apparatus, according to the present invention.

In the optical head linear motor mechanism 127, the yokes 53b', the permanent magnets 53a and the yokes 53b are located in this order from the optical head 24 on opposite sides thereof, as shown in FIG. 7. Since the yokes 53b', whose polarity is N, are located within the permanent magnets 53a and yokes 53b of S-polarity, the directions of the magnetic flux are shown by arrows G1, G2, G3 and G4, etc., in FIG. 7.

The linear bearing 51 includes a stationary member 71, a movable member 72, and balls 73 which are provided between the stationary member 71 and the movable member 72. The stationary member 71 is made of a generally U-shaped elongated plate secured to the optical head substrate 21. The movable member 72 is made of a generally U-shaped elongated plate mounted to the optical head carriage 23. The movable member 72 has a width smaller than that of the stationary member 71, so that the movable member 72 is located within the stationary member 71 through the balls 73. The balls 73 are movably fitted in corresponding grooves which are provided in the opposed inner and outer surfaces of the stationary member 71 and the movable member 72.

The optical head 24 converges the laser beams emitted from a laser source onto the magneto-optical disc 12 through an objective lens 8 (FIG. 1), receives the laser beams reflected from the magneto-optical disc 12 to read the photo magnetic recording signals when data is played-back, converges the laser beams, whose power is stronger than the laser beams used to reproduce (play-back) data onto the magneto-optical disc 12, to raise the temperature of the recording layer thereof to the Curie temperature, and overwrites data onto the recording layer using the magnetic head 25.

The magnetic head carriage 26, which supports the magnetic head 25, is supported to move in the radial direction of the magneto-optical disc 12 by the linear bearing 55 mounted to the magnetic head base 28 through a slide base 87. The linear bearing 55 includes a stationary member 75, a slider 76, and balls 77 which are provided between the stationary member 75 and the slider 76. The stationary member 75 is made of a generally U-shaped elongated plate secured to the slide base 87. The slider 76 is made of a generally U-shaped elongated plate mounted to the magnetic head casing 26. The slider 76 has a width smaller than that of the stationary member 75, so that the slider 76 is located within the stationary member 75 through the balls 77. The balls 77 are movably fitted in corresponding grooves, which are provided in the opposed inner and outer surfaces of the stationary member 75 and the slider 76.

The magnetic head carriage 26 is provided with coils 56, which are secured to opposite ends thereof. The coils 56 are movable with respect to respective yokes 57b' connected to yokes 57b. The yokes 57b and 57b' constitute a magnetic circuit 57 together with the permanent magnets 57a located between the respective yokes 57b and 57b'. Yokes 57b, yokes 57b', and coils 56 constitute the magnetic head linear motor mechanism 91.

In the magnetic head linear motor mechanism 91, the yokes 57b', the permanent magnets 57a and the yokes 57b are located in this order from the magnetic head 25 on opposite sides thereof, as shown in FIG. 7. Since the yokes 57b', having polarity of N, are located within the permanent magnets 57a and yokes 57b of S-polarity, the directions of the magnetic flux are shown by arrows H1, H2, H3 and H4, etc., in FIG. 7.

In the magneto-optical disc apparatus 20 as constructed above, in which the optical head 24 is provided on the front surface of the magneto-optical disc 12 to record or reproduce data, and the magnetic head 21 is provided on the rear surface of the magneto-optical disc 12 to apply a biasing magnetic field to the magneto-optical disc 12, the magnetic fields can be equally formed on the upper and lower sides of the magneto-optical disc 12 by respective optical head and magnetic head linear motor mechanisms 127 and 91. Because the permanent magnets 53a and 57a of the optical head and magnetic head linear motor mechanisms 127 and 91 tend to have an adverse influence on the recording characteristics of the magneto-optical disc 12, they are placed so that the directions of the magnetic fluxes G1, G2 and H1, H2, caused by the permanent magnets 53a and 57a, offset each other. Consequently, recording characteristics are not influenced by the magnetic fluxes.

The magnetic circuit 57 formed in the magnetic head carriage 26 is concentrated in the vicinity of the magnetic head 25, as shown in FIGS. 4, 8 and 9. The yokes 57b are partially cut-away at the outer side portions thereof to form stepped portions 88 (FIGS. 4, 8 and 9). Consequently, in the magnetic head carriage 26, when the magnetic head 25 is moved close to the magneto-optical disc 12 of the disc cartridge 11 when located in the loaded position to write data, as shown in FIG. 6, the part of the magnetic circuit 57, as well as the magnetic head 25, can be brought into the head access window 11a, which is opened by the movement of the shutter 54 (FIG. 21).

Consequently, the magnetic circuit 57 can be small and thin, which contributes to a realization of a thin and small magneto-optical disc apparatus without decreasing the power of the magnetic head driving mechanism.

As can be seen in FIG. 1, there are two pairs of reflection type photo sensors 30 and 31, each having a pair of light emitting and receiving elements, provided at the end of the magnetic head carriage 26. The optical head carriage 23 has a reflector holding portion 27 which extends in the direction of movement thereof and which holds, at the front end thereof, a reflector 32. The carriages 23 and 26 are set so that when the outputs of the two light receiving elements are identical, the position of the optical head 24 is coincident with the position of the magnetic head 25. The optical head carriage 23 is driven in the radial direction of the magneto-optical disc 12 in accordance with the signals of the control means 9 (FIGS. 1, 21). The magnetic head carriage 26 is controlled by a synchronization circuit of the control means 9, so that the outputs of the two light receiving elements are identical. Consequently, the magnetic head carriage 26 is moved synchronously with the optical head carriage 23.

As can be seen in FIG. 12, the magnetic head base 28 is substantially rectangular in plan view, and is provided with right and left abutments 110 provided on the rear end thereof in the insertion direction. The magnetic head base 28 is provided on the front end thereof with right and left positioning portions 97, having positioning holes 97a. The magnetic head base is further provided on the center portion of the magnetic head base with a rectangular positioning opening 112, which is slightly smaller than the rectangular base plate 87. The positioning portions 97 define abutting surfaces 97b with which the stop surface 90a (FIGS. 1 through 3) of the stop pin 90 come into contact at the lower surfaces of the positioning portions.

The stop surfaces 90a of the stop pins 90 and the abutment 49a (FIGS. 1 through 3) constitute a stop means which restricts the distance within which the head base 28 can be brought with respect to the magneto-optical disc 12. The closest position within which the head base 28 can be brought is defined as follows: when the guide cam plates 39 are moved to the position shown in FIG. 3, to move the cam pins 37 and 39 towards the respective loaded portions 41e and 43e of the cam grooves 41 and 43, respectively, for the magnetic head, the abutting surfaces 97b come into contact with the stop surface 90a, and the abutments 110 come into contact with the projection 49a. In this state, the cam pins 37 and 39 are located slightly above the upper wall surface of the loaded portions 41e and 43e. The front ends 90b of the stop pins 90 are slidably inserted in the positioning holes 97a of the positioning portions 97 to guide the abutting surfaces 97b of the positioning portions 97 towards the stop surfaces 90a. The stop pins 90 are loosely fitted in the positioning holes 97a.

Head base plates 93 are mounted to the right and left ends of the magnetic head base 28 in the insertion direction. The head base plates 93 are located closer to the magneto-optical disc 12 than the magnetic head base 28, and are used for stabilizing the position of the head base with respect to the magneto-optical disc 12. The head base plates 93 are each provided on one side thereof with the cam pins 37 and 39, and on the other sides with a bent engaging claw 93a. The head base plates 93 are provided on the center portions thereof with studs 95 which extend through the holes 111 (FIG. 4) of the magnetic head base 28 provided in the vicinity of the right and left ends thereof.

Holes 96 are provided in the vicinity of the holes 111 of the magnetic head base 28, so that the engaging claws 93a extend upward through the holes 96 to engage with the upper surface of the magnetic head base 28. The engaging claws 93a are inserted in the holes 96 from the lower sides thereof to project from the upper surface of the magnetic head base 28. The studs 95 are inserted in the holes 111, as can be seen in FIG. 4. Thereafter, biasing springs 94 are fitted around the studs 95. The studs 95 and the biasing springs 94, and accordingly, the biasing springs 94 and the head base plates 93, are connected through E-rings provided therebetween around the corresponding studs.

Each of the head base springs 94 is made of a leaf spring elongated in plan view (FIG. 13) and is provided on opposite ends thereof with positioning projections 94a projecting in the same direction. The biasing springs 94 are provided with crown portions in the vicinity of opposite ends thereof in a side view in FIG. 1.

Figure 13:
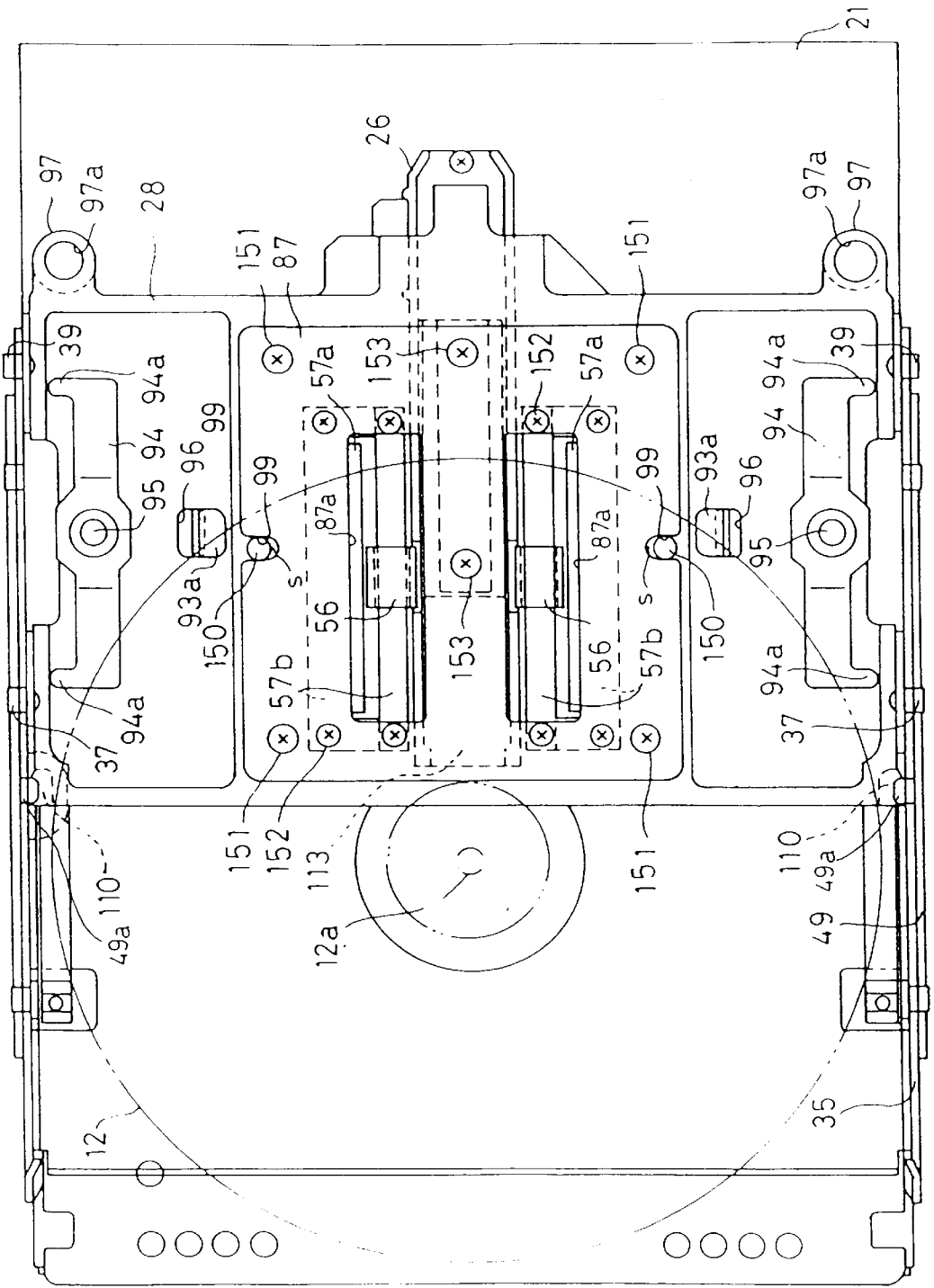
FIG. 13 is a plane view of a magnetic head base attached to a magneto-optical disc apparatus, shown in FIG. 12.

Consequently, when the head base plates 93 and the biasing springs 94 are set on the opposite sides of the magnetic head base 28 at the longitudinal ends thereof, as shown in FIG. 13, the head base plates 93 are continuously biased to rotate in the directions J and K, in FIG. 4, together with the cam pins 37 and 39, about the engaging claws 93a, by the upward biasing force applied to the head base plates from the biasing springs 94 through the studs 95.

Consequently, when the base plate 87 is restricted by the stop surfaces 90a of the stop pins 90 and the projections 49a of the stationary cam plate 49, the cam pins 37 and 39, which are moved to the loaded portions 41e and 43e of the magnetic head cam grooves 41 and 43, are pressed further downward by the upper surface of the loaded portions 41e and 43e. Accordingly, the right and left head base plates 93 are rotated about the respective engaging claws 93a in directions opposite to the directions J and K (FIG. 4), against the spring force of the biasing springs 94. Namely, the downward biasing force is transmitted to the magnetic head base 28 from the rotating left and right head base plates 93 through the engaging claws 93a, so that the abutting surfaces 97b of the positioning portions 97 and the abutments 110 are elastically depressed against the stop surfaces 90a of the stop pins 90 and the projections 49a, respectively.

Consequently, in the record/play-back position, in which the magnetic head 25 is loaded, the cam pins 37 and 39 are depressed against the upper surfaces of the loaded portions 41e and 43e of the cam grooves 41 and 43 by the spring force, and the stop surfaces 97b of the magnetic head base 28 are depressed against the stop surfaces 90a of the stop pins 90 by the spring force. Furthermore, the abutments 110 are depressed against the projections 49a by the spring force. Consequently, not only can precise positioning of the magnetic head 25 be achieved, but also the magnetic head 25 can be stably held in the loaded position near the magneto-optical disc 12, resulting in stable recording and reproduction.

As shown in FIGS. 11 and 13, the base plate 87 has two juxtaposed rectangular openings 87a, which are elongated in the direction perpendicular to line connecting guide recesses 99 which are provided on opposite ends of the base plate 87. The base plate 87 is also provided with a positioning portion 113 between the rectangular openings 87a to hold the stationary member 75 of the linear bearing 55. The stationary member 75 (FIG. 4) is provided with two threaded holes along the longitudinal direction thereof, and the positioning portion 113 is provided with two adjusting holes (not shown) corresponding to the threaded holes of the stationary member 75. The diameter of the adjusting holes is smaller than the diameter of the heads of the set screws 153, and larger than the diameter of the threaded portions of the set screws 153. The adjusting holes of the base plate 87 and the set screws 153, which can be inserted in the adjusting holes, constitute a position adjusting mechanism which adjusts the parallel arrangement of the magnetic head carriage 26, including the photo sensors 30, 31 and the magnetic head 25, with respect to the optical head carriage 27, including the reflector 32 and the optical head 24.

As shown in FIG. 11, there are four position adjusting holes 98 provided at the four corners of the base plate 87. The diameter of the position adjusting holes 98 is smaller than the diameter of the heads of the set screws 151 and larger than the threaded portions of the set screws 151. The magnetic head base 28 is provided with threaded holes 120 surrounding the positioning openings 112 (FIG. 12) and corresponding to the position adjusting holes 98, so that the set screws 151 can be screwed in the threaded holes 120.

Rotation restricting pins 150 are provided on the magnetic head base 28 on the right and left sides of the positioning openings 112. The rotation restricting pins 150 are slidably fitted in the guide recesses 99 of the base plate 87 so as to slide the base plate 87 in the longitudinal direction of the magnetic head base 28. In FIG. 13, in which the two rotation restricting pins 150 are engaged in the corresponding guide recesses 99, there are gaps "s" between the rotation restricting pins 150 and the inner wall surfaces of the guide recesses 99. The set screws 151, the position adjusting holes 99, and the rotation restricting pins 150 constitute a position adjusting mechanism which moves the magnetic head 25 in the direction (i.e., lateral direction with respect to the insertion direction of the disc) intersecting the direction of the movement of the optical head 24 (and the magnetic head 25) to adjust the relative position of the base plate 87 and the magnetic head base 28.

The following discussion will be directed to a magnetic head engaging mechanism which automatically locks the magnetic head 25, located in the unloaded position, with reference to FIGS. 14 through 19.

Figure 14:
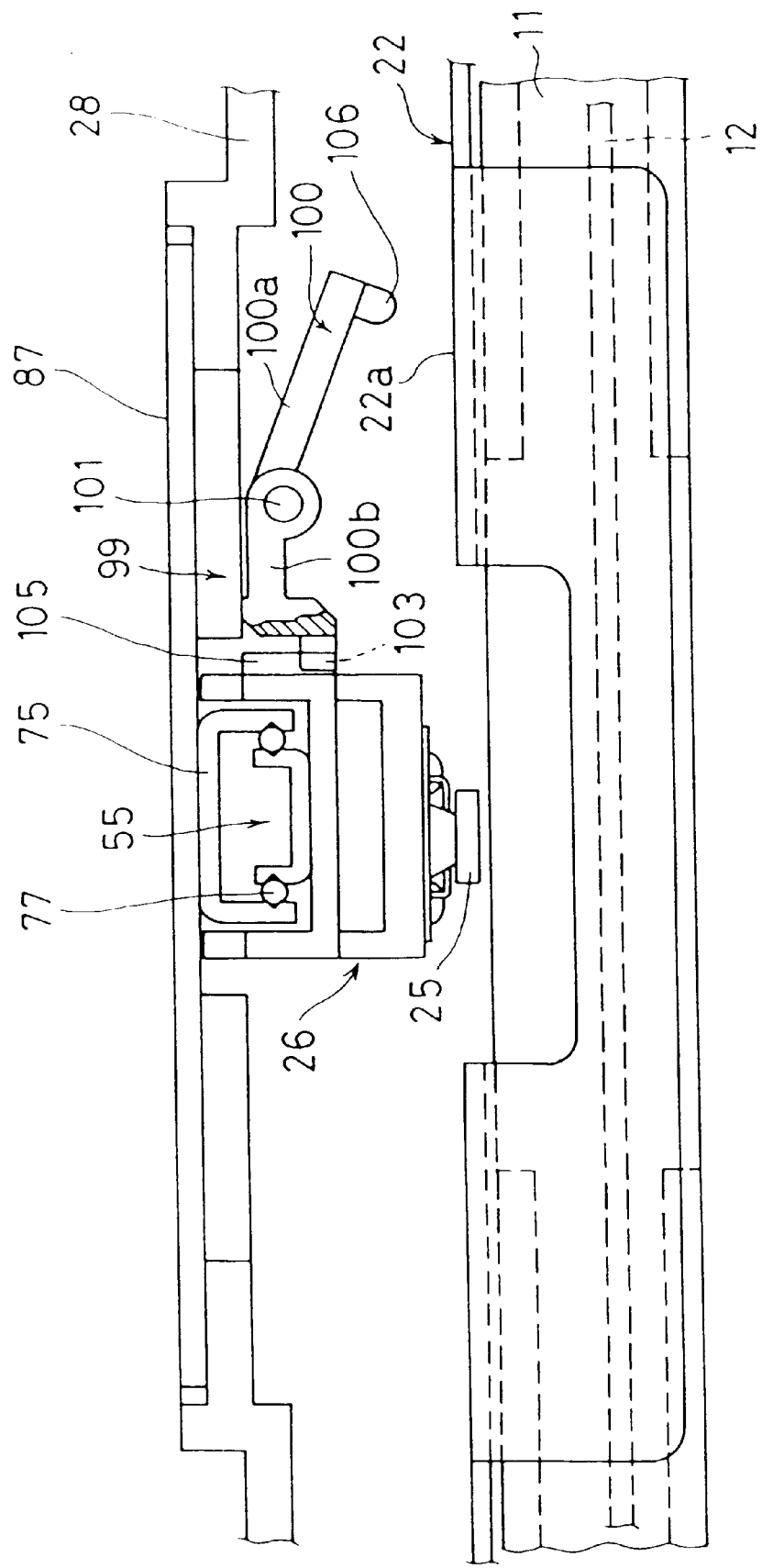
FIG. 14 is an end view of a magnetic head engaging mechanism, viewed from the direction indicated as D in FIG. 1.
Figure 15:
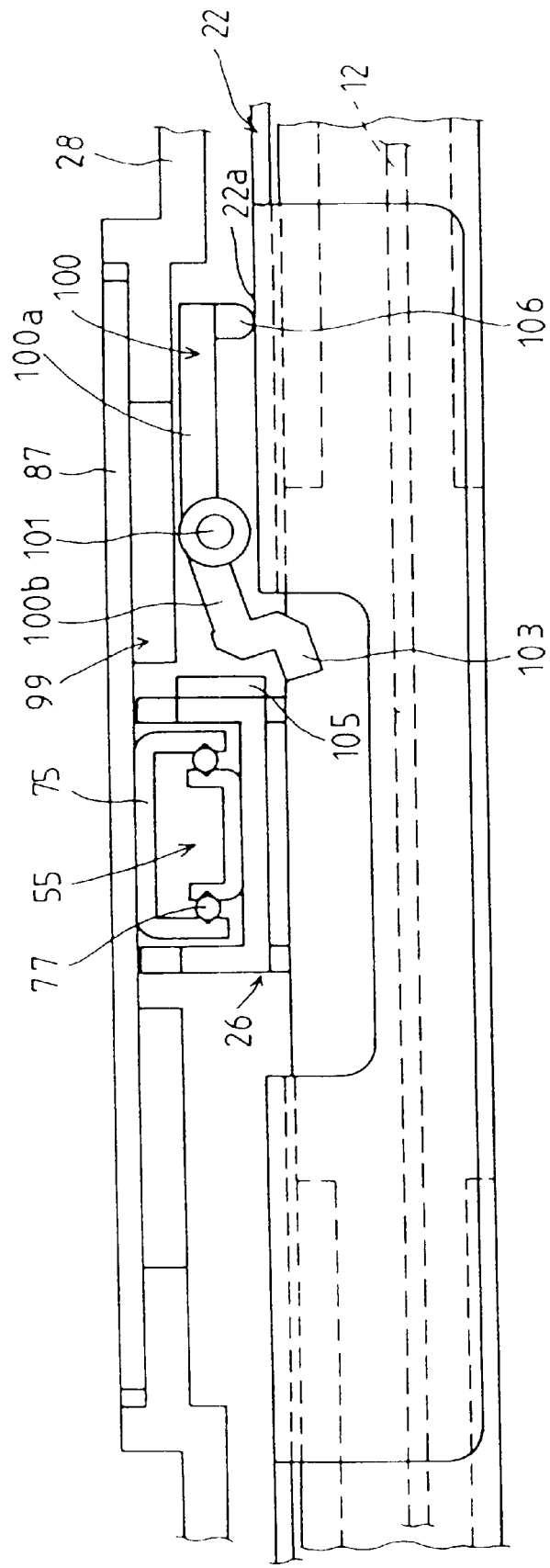
FIG. 15 is an end view of a magnetic head engaging mechanism, viewed from the direction indicated as F in FIG. 3.
Figure 16:
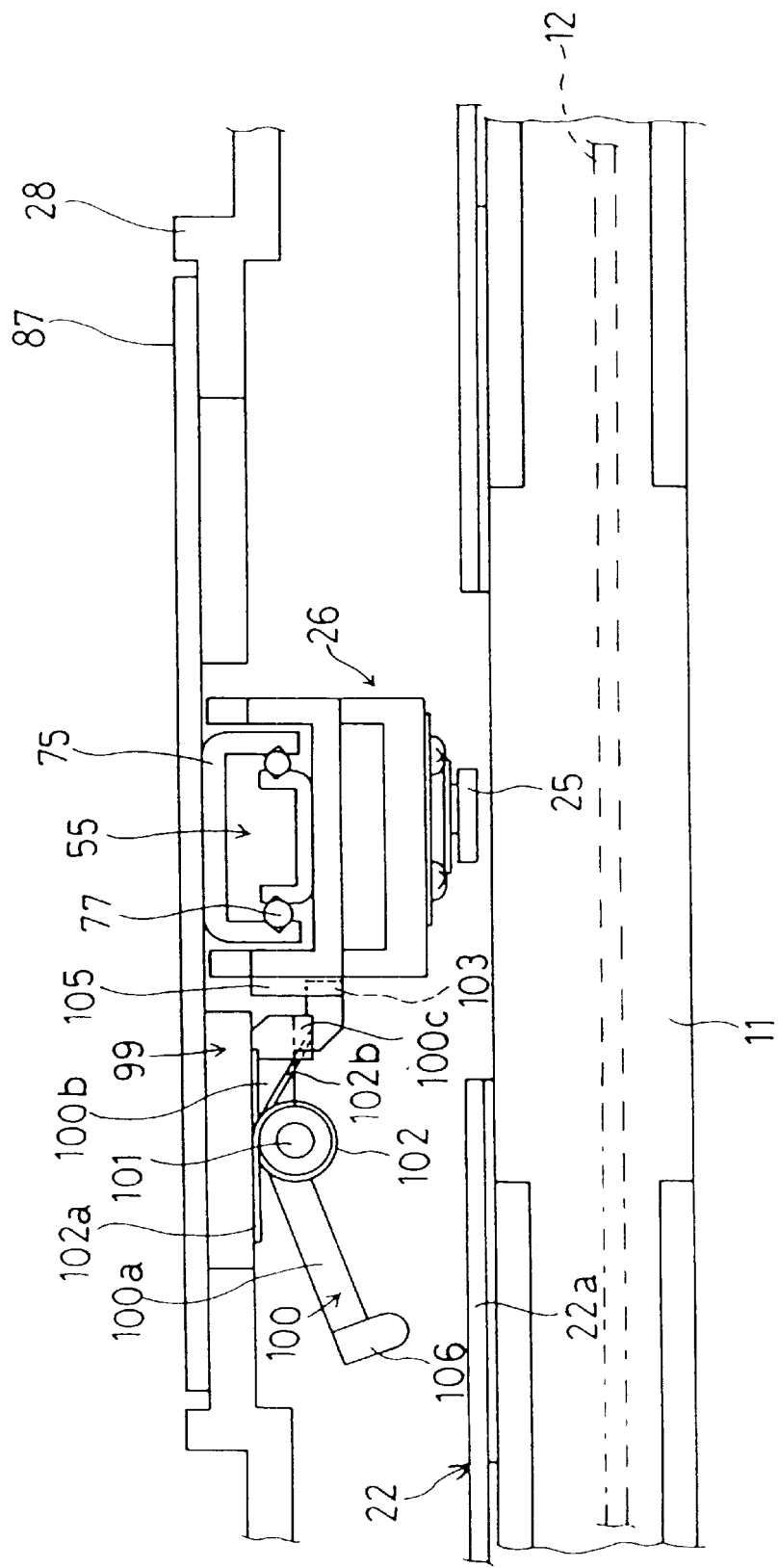
FIG. 16 is an end view of a magnetic head engaging mechanism, viewed from a direction opposite to the direction D in FIG. 1.
Figure 17:
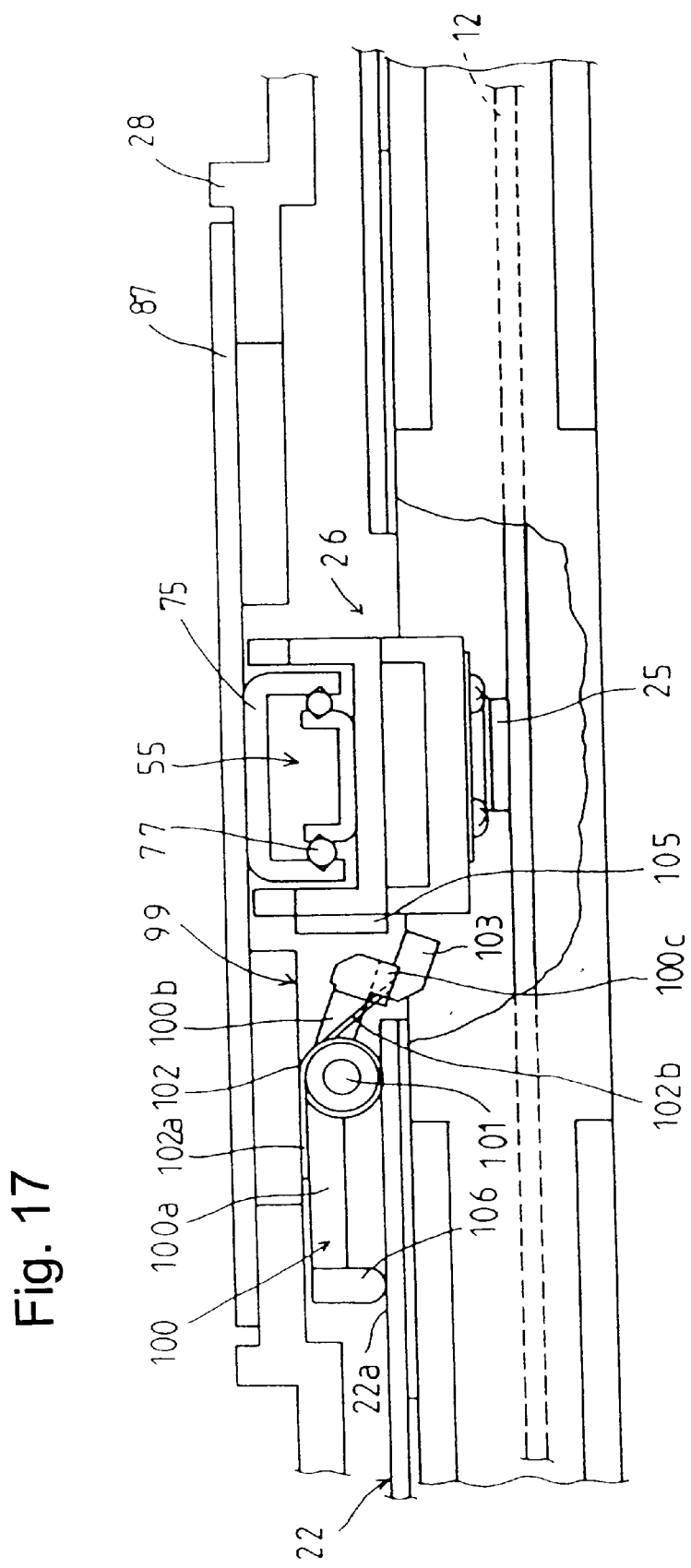
FIG. 17 is an end view of a magnetic head engaging mechanism, viewed from a direction opposite to the direction F in FIG. 3.

FIGS. 14 and 15 show a magnetic head engaging mechanism 99 viewed from the directions D and F in FIGS. 1 and 3, respectively. FIGS. 16 and 17 show a magnetic head engaging mechanism 99 shown in FIGS. 7 and 8, viewed from the directions opposite to the directions D and F in FIGS. 1 and 3.

Figure 18:
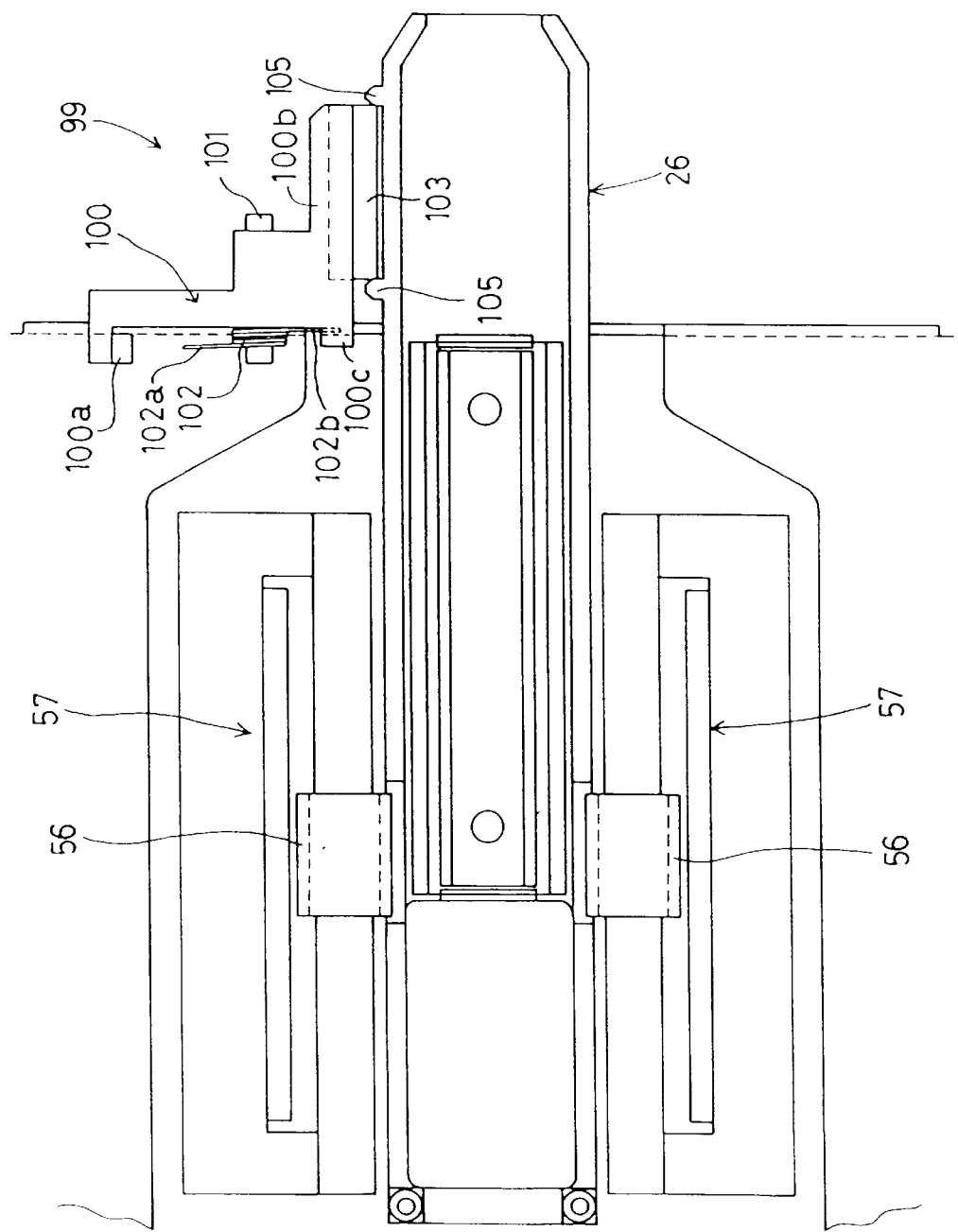
FIG. 18 is an enlarged bottom view of a magnetic head engaging mechanism shown in FIG. 15.

As can be seen in FIG. 18, the magnetic head carriage 26 is provided, on the one side of the front end thereof, with two engaging teeth 105, spaced from one another at a predetermined distance. The magnetic head base 28 is provided, on the rear end of the back surface thereof, with a pivot shaft 101 which is opposed to the engaging teeth 105 when the magnetic head carriage 26 is moved to the rearmost position in the disc insertion direction. The clamp lever 100 having a release arm 100a and a lock arm 100b which can be engaged by the engaging teeth 105 of the magnetic head carriage 26 on opposite sides of the pivot shaft 101 is rotatably supported by the pivot shaft 101.

The clamp lever 100 is biased by a coil spring 102 wound about the pivot shaft 101 in a direction to bring the lock arm 100b into contact with the engaging teeth 105 of the magnetic head carriage 26. Namely, the coil spring 102 abuts at one end 102a thereof against the back surface of the magnetic head base 28, and is connected at the other end 102b thereof to a spring engaging portion 100c of the clamp lever 100, so that the clamp lever 100 is biased to rotate in the clockwise direction in FIG. 17. Accordingly, the upper portion of the lock arm 100b is engaged by the back surface of the magnetic head base 28, and the lock tooth 103 of the clamp lever can be engaged by the engaging teeth 105. The release arm 100a of the clamp lever 100 is provided on the front end thereof with an abutting projection 106 which comes into contact with the release portion 22a of the cartridge holder 22 to rotate the clamp lever 100 against the rotational biasing force.

In the magneto-optical disc apparatus 20 as constructed above, the magnetic head base 28 is spaced from the cartridge holder 22 at a predetermined distance in the unloaded position shown in FIG. 1, and the clamp lever 100 is rotated in the clockwise direction in FIG. 14 by the biasing force of the coil spring 102 to press the upper portion of the lock arm 100b against the back surface of the magnetic head base 28. Consequently, the lock tooth 103 is engaged between the two engaging teeth 105, so that the magnetic head carriage 26, and accordingly, the magnetic head 25, are certainly locked in a position in which the magnetic head is spaced from the magneto-optical disc 12. Thus, the reliability (or resistance to shock) when the apparatus 20 is not being used, or during transportation of the apparatus 20, is enhanced.

In the unloaded position, when the disc cartridge 11 is inserted in the cartridge holder 22, the shutter opening arm 140 is rotated in the counterclockwise direction in FIG. 20 to turn the loading switch 80 ON, so that the drive motor 61 is rotated in the forward direction to move the guide cam plates 35 through the rack plate 59 in the direction A in FIG. 1 from the unloaded position. As a result, the disc cartridge 11 is lowered until the lower surface thereof comes into contact with the reference surface defined by the upper surfaces 50a of the guide rollers 50. During the downward movement of the disc cartridge, the cam pins 36 and 38 thereof are guided by the moving portions 40b and 42b of the respective cam grooves 40 and 42.

The magnetic head 25, when located in the unloaded position at the initial position of the guide cam plates 35, similar to the disc cartridge 11, is moved to the intermediate position between the loaded position and the unloaded position in accordance with the movement of the guide cam plates 35 (FIGS. 2 and 5). Namely, at the beginning of the movement of the guide cam plates 35, the cam pins 37 and 39 are moved and guided by the moving portions 41b and 43b, respectively, of the cam grooves 41 and 43 for the magnetic head, so that the cam pins 37 and 39 come to the intermediate step portions 41c and 43c, respectively.

Since the first and third detecting switches 65 and 67 are turned OFF, and the second detecting switch 66 is turned ON by the switch operation plate 60, which is moved together with the guide cam plates 35, movement of the cartridge holder 22 to the loaded position and movement of the magnetic head 25 to the intermediate position between the loaded position and the unloaded position can be detected. Consequently, the optical code signals recorded on the inner track of the magneto-optical disc are read by the optical head 24. Thereafter, the disc judging means 68 detects the kind of the magneto-optical disc 12 (i.e., double-sided or single-sided recording disc) loaded in the apparatus, in accordance with the read optical code signals.

If the magneto-optical disc 12 is the double-sided disc, the movement control means 7 does not drive the drive motor 61. Accordingly, no further movement of the guide cam plates 35 occurs. Consequently, the magneto-optical disc apparatus 20 is in a position in which only play-back using the optical head 24 can be effected.

If the magneto-optical disc 12 is the single-sided disc, the movement control means 7 drives the drive motor 61 in the forward direction, so that a further movement of the guide cam plates 35 occurs in the same direction. Consequently, the magnetic head 25 is moved to the loaded position in which both the recording and the play-back can be effected (FIGS. 3 and 6).

As can be understood from the foregoing, in the magneto-optical disc apparatus 20 according to the present invention, the movement of the cartridge holder 11 and the magnetic head 25 can be controlled by the movement of the guide cam plates 35 through the holder cam grooves 40, 42 and the head cam grooves 41 and 43 provided in the guide cam plates 35. Furthermore, the magnetic head 25 can be stably moved close to the magneto-optical disc 12 when located in the loaded position.

When the magneto-optical disc apparatus 20 is in a position in which the play-back can be carried out, the abutting projection 106 of the clamp lever 100 abuts against the release portion 22a of the cartridge holder 22, to rotate the same in the counterclockwise direction in FIG. 14 against the rotational biasing force of the coil spring 102. Consequently, the lock tooth 103 is disengaged from the engaging teeth 105, so that the magnetic head carriage 26 (or the magnetic head 25) which has been locked to the magnetic head base 28 is unlocked. Thus, the magnetic head carriage 26 can be moved by the magnetic head linear motor mechanism 91.

As can be seen from the above discussion, according to the present invention, when magnetic head 25 is not used, the magnetic head carriage 26 is automatically engaged by the lock arm 100b, so that the magnetic head 25 can be locked. Accordingly, for example, upon transporting the magneto-optical disc apparatus, movement of the magnetic head carriage 26 does not occur, and accidental collision of the magnetic head 25 with a stationary portion or the like, due to oscillation, does not take place.

Figure 19:
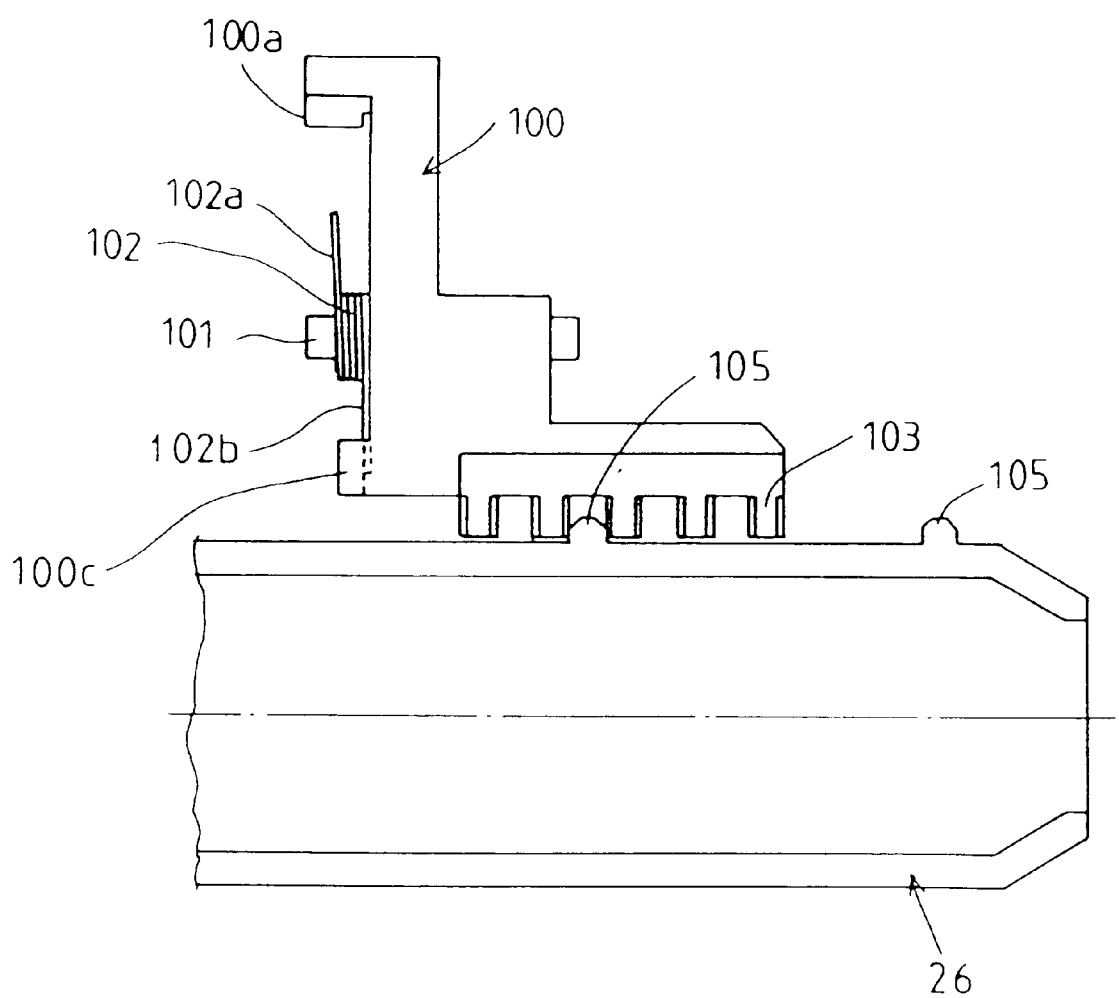
FIG. 19 is a bottom view of another embodiment of a magnetic head engaging mechanism, according to the present invention.

The lock tooth 103 can be replaced with a plurality of lock teeth which can be engaged either between the engaging teeth 105, or by one of the engaging teeth 105, as shown in FIG. 19.

Since the magnetic circuit 57 of the magnetic head carriage 26 is provided with the stepped portions (entrances) 88, the lower portion of the magnetic circuit 57 can be received in the head access window 11a which is opened by the displacement of the shutter 54. Consequently, the magnetic head linear motor mechanism 91, which moves the magnetic head 25, can be partly received in the head access window 11a of the disc cartridge 11 located in the loaded position, together with the magnetic head 25. Accordingly, the whole magneto-optical disc apparatus 20 can be made thin without decreasing the power of the magnetic head moving mechanism.

Although the invention has been described with reference to particular means, materials and embodiments, it is to be understood that the invention is not limited to the particulars disclosed and extends to all equivalents within the scope of the claims.

We claim:

1. A magneto-optical disc apparatus including a magnetic head which is movable towards and away from a magneto-optical disc and which applies a magnetic field to the magneto-optical disc to record and/or play-back data, comprising:

a head base which supports the magnetic head;

a head base stop member for restricting the distance within which said head base can be brought with respect to the magneto-optical disc;

at least one head base plate which moves together with said head base towards and away from the magneto-optical disc;

at least one stud provided on said at least one head base plate and extending through said head base;

a spring member supported on said at least one stud for biasing said head base against said head base stop member when said at least one head base plate is moved towards the magneto-optical disc beyond the point at which said head base contacts said head base stop member; and at least one head base plate stop mechanism biased in a direction toward the magneto-optical disc when said head base stop member restricts said head base.

2. A magneto-optical disk apparatus comprising:

a holder which holds a magneto-optical disc cartridge containing a magneto-optical disc and which is movable between a loaded position, in which said holder is close to an optical head, and an unloaded position, in which said holder is apart from said optical head;

a magnetic head which is movable between a stand-by position, in which said magnetic head is spaced apart from said magneto-optical disc by a predetermined distance measured in a direction perpendicular to a plane of rotation of said magneto-optical disc in said magneto-optical disc cartridge in said loaded position, and an operative position, in which said magnetic head is positioned close to said magneto-optical disc, wherein said close position is at a distance from the said optical head which is less than said predetermined distance, said distance at said close position being measured in a direction perpendicular to the plane of rotation of said magneto-optical disc in said magneto-optical disk cartridge in said loaded position, wherein said magnetic head is movable between said stand-by position and said operative position while said holder remains in said loaded position; and detecting means for detecting whether the magneto-optical disc loaded in said magneto-optical disc cartridge is a double-sided recording disc or a single-sided recording disc;

wherein in response to a double-sided recording disc being detected by said detecting means, said magnetic head is positioned at said stand-by position simultaneously with the positioning of said holder in said loaded position, wherein said magnetic head is disabled from recording data, and in response to a single sided recording disc being detected by said detecting means, said magnetic head is positioned at said operative position.

3. A magneto-optical disc apparatus according to claim 2, further comprising:

a loading guide member for guiding said holder between said loaded position and said unloaded position; and a magnetic head guiding member for guiding said magnetic head between said stand-by position and said operative position, wherein said magnetic head is movable between said stand-by position and said operative position while said holder remains in said loaded position.

4. A magneto-optical disc apparatus according to claim 3, wherein said loading guide member and said magnetic head guiding member comprise guide cam plates.

5. A magneto-optical disc apparatus according to claim 4, wherein holder cam grooves are provided on said guide cam plates; said holder cam grooves comprising initial and final portions corresponding to initial and final positions of said guide cam plates, and wherein said holder is held in said unloaded position at said initial position of said guide cam plates, and is moved to and from said loaded position when said cam plates are moved between said initial and final positions.

6. A magneto-optical disc apparatus according to claim 4, wherein head cam grooves are provided on said guide cam plates; said head cam grooves comprising initial, intermediate and final portions corresponding to initial, intermediate and final positions of said cam plates, and wherein said magnetic head is held in said stand-by position at said initial position of said cam plates, and is moved to and from said operative position when said cam plates are moved between said initial position, through said intermediate position, to said final position.

7. A magneto-optical disc apparatus according to claim 3, wherein said detecting means comprises a movement control mechanism for controlling movement of said magnetic head to said operative position when a single-sided recording disc is detected by said detecting means.

8. A magneto-optical disc apparatus according to claim 7, further comprising a linear motor mechanism which moves the magnetic head and a head access window provided in the cartridge, so that the magnetic head can be received in said head access window.

9. A magneto-optical disc apparatus according to claim 8, further comprising a magnetic head moving mechanism which moves the linear motor mechanism to insert a part of said linear motor mechanism and the magnetic head in said head access window of the cartridge when located in the loaded position.

10. A magneto-optical disc apparatus according to claim 3, wherein said optical head is provided on one side of the magneto-optical disc and said magnetic head is provided on the other side of the magneto-optical disc.

11. A magneto-optical disc apparatus according to claim 10, further comprising a first linear motor mechanism which moves said optical head in a radial direction of the magneto-optical disc, and a second linear motor mechanism which moves said magnetic head in a radial direction of the magneto-optical disc.

12. A magneto-optical disc apparatus according to claim 11, wherein said first and second linear motor mechanisms comprise permanent magnets which generate magnetic fluxes; said permanent magnets being arranged so that said magnetic fluxes offset each other at the location of the magneto-optical disc.

13. A magneto-optical disc apparatus according to claim 3, further comprising a magnetic head base which is movable towards and away from the magneto-optical disc, and a magnetic head carriage which is supported by said magnetic head base to move in the radial direction of the magneto-optical disc and which supports said magnetic head.

14. A magneto-optical disc apparatus according to claim 13, further comprising a clamp lever held by said magnetic head base, said clamp lever being provided with release arms which are rotatable about an axis on opposite sides of said axis, and a lock arm which can be engaged with said magnetic head carriage.

15. A magneto-optical disc apparatus according to claim 14, further comprising means for biasing said clamp lever to rotate, so that said lock arm comes into contact with said magnetic head carriage.

16. A magneto-optical disc apparatus according to claim 15, further comprising a releasing portion on one side of the magneto-optical disc, which engages with said release arms to rotate said clamp lever against the rotational biasing force, when said magnetic head base comes close to the magneto-optical disc.

17. A magneto-optical disc apparatus according to claim 3, further comprising a carriage which holds said magnetic head and is movable in the radial direction of the magneto-optical disc.

18. A magneto-optical disc apparatus according to claim 17, further comprising a cantilever type plate having a base end secured said carriage and a free end to which said magnetic head is secured.

19. A magneto-optical disc apparatus according to claim 18, wherein said base end of said cantilever type plate is located in the vicinity of a center of rotation of the magneto-optical disc and said free end of said cantilever type plate extends from said base end towards the outer periphery of the magneto-optical disc.

20. A magneto-optical disc apparatus according to claim 3, further comprising:
    a head base which supports said magnetic head;
    a restricting mechanism for restricting the distance within which said head base can be brought with respect to the magneto-optical disc; and,
    a biasing member for biasing said head base towards the magneto-optical disc at said restricted distance.

21. A magneto-optical disc apparatus according to claim 3, wherein said detecting means comprises a movement control mechanism for controlling movement of said magnetic head to prevent movement of said magnetic head from said stand-by position to said operative position when a double-sided recording disc is detected by said detecting means.

22. The magneto-optical apparatus of claim 3, said stand-by position further comprising an initial position and an intermediate position, wherein said intermediate position is closer to said magneto-optical disc, in a direction perpendicular to the plane of rotation of the magneto-optical disc in said magneto-optical disc cartridge in said loaded position, than said initial position.

23. The magneto-optical apparatus of claim 3, wherein when said magnetic head is in said stand-by position, said magnetic head is inoperative and said optical head can perform a reading operation, and wherein when said magnetic head is in said operative position, said magnetic head can apply a magnetic field to said magneto-optical disc and said optical head can perform a reading operation and a writing operation.

24. A magneto-optical disc apparatus according to claim 2, wherein said detecting means detects whether a magneto-optical disc loaded in the disc cartridge is a double-sided recording disc or a single-sided recording disc when said holder is moved to said loaded position and said magnetic head is moved to said stand-by magnetic head position.

25. A magneto-optical disc apparatus according to claim 2, wherein a movement control mechanism controls movement of said magnetic head to said operative position when a single-sided recording disc is detected by said detecting means.

26. The magneto-optical apparatus of claim 2, said stand-by position further comprising an initial position and an intermediate position, wherein said intermediate position is closer to said magneto-optical disc, in a direction perpendicular to the plane of rotation of the magneto-optical disc in said magneto-optical disc cartridge in said loaded position, than said initial position.

27. A magneto-optical disk apparatus comprising:
    an optical head for reading a magneto-optical disk;
    a magnetic head for writing to said magneto-optical disk;
    a magnetic head moving mechanism having a stand-by position in which said magnetic head is inoperative and a loaded position in which said magnetic head may write to said magneto-optical disk;
    a disk holder for holding said magneto-optical disk;
    a disk holder moving mechanism having a loaded position in which said disk is readable by said optical head, and an unloaded position in which said magneto-optical disk may be removed from said disk apparatus;
    a disk detector that detects whether said magneto-optical disk is a double-sided recording disk or a single-sided recording disk; and
    a controller that includes a movement controller that controls said magnetic head moving mechanism and said disk holder moving mechanism to move said magnetic head to said standby position and said disk holder to said loaded position when said magneto-optical disk is a double-sided magneto-optical disk, whereby said double-sided disk may be read by said optical head said movement controller controlling said magnetic head moving mechanism and said disk holder moving mechanism to move said magnetic head and said disk holder to said respective loaded positions when said magneto-optical disk is a single-sided magneto-optical disk, whereby said single-sided disk may be read by said optical head and written to by said magnetic head.

28. The magneto-optical disk apparatus according to claim 27,
    wherein said magnetic head is a magnetic modulation head that modulates a magnetic field to change an optical state of said magneto-optical disk.

29. A magneto-optical disk apparatus comprising:
    an optical head for reading a magneto-optical disk;
    a magnetic head for writing to said magneto-optical disk;
    a magnetic head moving mechanism having a stand-by position in which said magnetic head is inoperative and a loaded position in which said magnetic head may write to said magneto-optical disk;
    a disk holder for holding said magneto-optical disk;
    a disk holder moving mechanism having a loaded position in which said disk is readable by said optical head, and an unloaded position in which said magneto-optical disk may be removed from said disk apparatus;
    a disk detector that detects whether said magneto-optical disk is a double-sided recording disk or a single-sided recording disk; and
    a controller that includes a movement controller that controls said magnetic head moving mechanism and said disk holder moving mechanism to move said magnetic head to said standby position and said disk holder to said loaded position when said magneto-optical disk is a double-sided magneto-optical disk, whereby said magnetic head is inoperative but said double-sided disk may be read by said optical head.

30. The magneto-optical disk apparatus according to claim 29, wherein said disk holder moving mechanism moves a disk cartridge housing said magneto-optical disk.

31. A magneto-optical disk apparatus comprising:

an optical head for reading a magneto-optical disk;

a magnetic head for writing to said magneto-optical disk;

a magnetic head moving mechanism having an initial position in which said magnetic head is inoperative, a loaded position in which said magnetic head may write to said magneto-optical disk, and an intermediate position, between said initial position and said loaded position, in which said magnetic head is inoperative;

a disk holder for holding said magneto-optical disk in a loaded position in which said disk is readable by said optical head;

a control system that includes: a movement controller that controls said magnetic head moving mechanism to move said magnetic head from said initial position to stop at said loaded position, whereby a single-sided magneto-optical disk is writable by said magnetic head said movement controller controlling said magnetic head moving mechanism to move said magnetic head from said initial position to stop at said intermediate position, whereby a double-sided magneto-optical disk is not writable by said magnetic head.

* * * * *